United States Patent
Lee et al.

(10) Patent No.: US 12,088,356 B2
(45) Date of Patent: Sep. 10, 2024

(54) ELECTRONIC DEVICE FOR ADJUSTING OUTPUT POWER OF SIGNAL BY USING MILLIMETER WAVE, AND CONTROL METHOD THEREFOR

(71) Applicant: Samsung Electronics Co., Ltd., Gyeonggi-do (KR)

(72) Inventors: Junghun Lee, Gyeonggi-do (KR); Chiho Kim, Gyeonggi-do (KR); Hyunkee Min, Gyeonggi-do (KR); Taehun Lim, Gyeonggi-do (KR); Junsu Choi, Gyeonggi-do (KR); Haekwon Lee, Gyeonggi-do (KR); Jongheon Jeong, Gyeonggi-do (KR); Sunkey Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 17/583,508

(22) Filed: Jan. 25, 2022

(65) Prior Publication Data

US 2022/0149958 A1  May 12, 2022

Related U.S. Application Data

(63) Continuation of application No. PCT/KR2020/010791, filed on Aug. 13, 2020.

(30) Foreign Application Priority Data

Aug. 21, 2019  (KR) ......................... 10-2019-0102661

(51) Int. Cl.
*H04B 17/10* (2015.01)
*G01S 13/04* (2006.01)
(Continued)

(52) U.S. Cl.
CPC .............. *H04B 17/11* (2015.01); *G01S 13/04* (2013.01); *G08B 13/181* (2013.01); *H04B 1/04* (2013.01);
(Continued)

(58) Field of Classification Search
CPC ........ H04B 1/04; H04B 17/102; H04B 17/11; H04B 17/103; H04B 17/104;
(Continued)

(56) References Cited

U.S. PATENT DOCUMENTS 6,954,145 B2   10/2005   Nakamura et al.
8,825,102 B2    9/2014   Chakraborty et al.
(Continued)

FOREIGN PATENT DOCUMENTS

KR      10-1208127 B1    12/2012
KR      10-1589836 B1     1/2016

OTHER PUBLICATIONS

Korean Office Action dated Dec. 20, 2023.

*Primary Examiner* — Blane J Jackson
(74) *Attorney, Agent, or Firm* — Cha & Reiter, LLC

(57) ABSTRACT

An electronic device using a millimeter wave, according to various embodiments, includes a communication circuit and at least one processor. The at least one processor can be configured to: control the communication circuit so that a first millimeter wave signal is output at a first strength; use the communication circuit so that the first millimeter wave signal receives a first reflection signal reflected by an object; confirm whether the object is positioned within a first distance from the electronic device; determine the strength of a second millimeter wave signal to be a second strength corresponding to a second distance between the electronic device and the object, the second distance being shorter than the first distance; and control the communication circuit so
(Continued)

that the second millimeter wave signal is output at the determined second strength.

18 Claims, 17 Drawing Sheets

(51) Int. Cl.
    *G08B 13/181*     (2006.01)
    *H04B 1/04*     (2006.01)
    *H04B 17/11*     (2015.01)
    *H04W 52/18*     (2009.01)
    *H04W 52/34*     (2009.01)

(52) U.S. Cl.
    CPC ........ *H04B 17/102* (2015.01); *H04W 52/346* (2013.01)

(58) Field of Classification Search
    CPC ... H04W 52/346; H04W 52/18; H04W 52/30; G01S 13/04; G08B 13/181
    See application file for complete search history.

(56) References Cited

U.S. PATENT DOCUMENTS

| | | |
|---|---|---|
| 9,553,637 B2 | 1/2017 | Yang et al. |
| 2010/0038970 A1 | 2/2010 | Cook et al. |
| 2014/0302886 A1* | 10/2014 | Yun .................... H04W 52/283 455/522 |
| 2016/0164563 A1 | 6/2016 | Khawand et al. |
| 2016/0365886 A1 | 12/2016 | Prendergast et al. |
| 2019/0044560 A1 | 2/2019 | Koshy |
| 2019/0267709 A1* | 8/2019 | Mow ...................... H01Q 21/24 |

\* cited by examiner

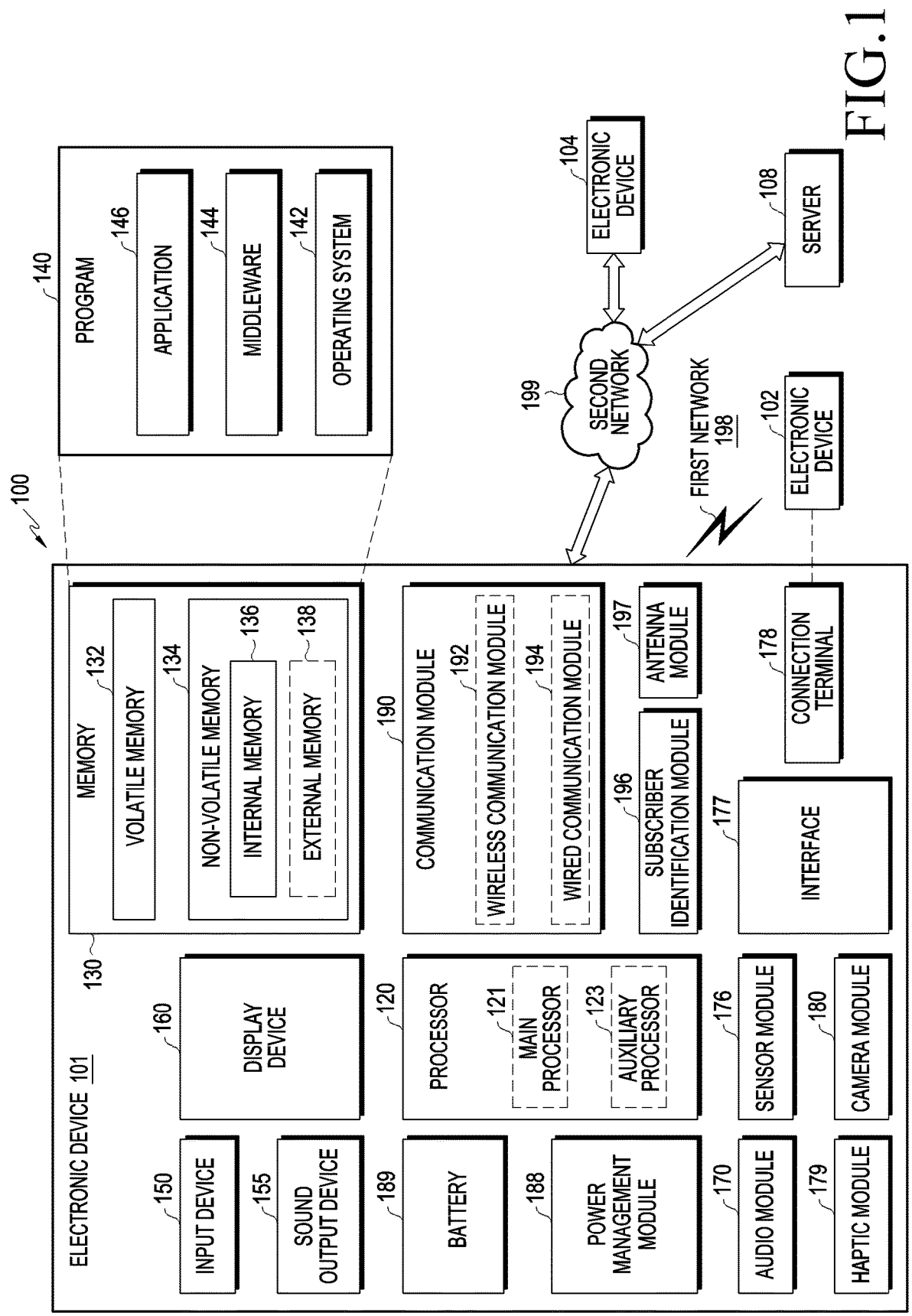

ELECTRONIC DEVICE FOR ADJUSTING OUTPUT POWER OF SIGNAL BY USING MILLIMETER WAVE, AND CONTROL METHOD THEREFOR

CROSS-REFERENCE TO RELATED APPLICATION(S)

This application is a continuation of and claims priority under 35 U.S.C. § 120 to PCT International Application No. PCT/KR2020/010791, which was filed on Aug. 13, 2020, and claims priority to Korean Patent Application No. 10-2019-0102661, filed on Aug. 21, 2019, in the Korean Intellectual Property Office, the disclosures of which are incorporated by reference herein their entirety.

BACKGROUND

Technical Field

Various embodiments of the disclosure relate to an electronic device for adjusting communication power using a millimeter wave and a method for controlling the same.

Description of Related Art

More and more services and additional functions are being provided through electronic devices, e.g., smartphones, or other portable electronic devices. To meet the needs of various users and raise the efficiency of usage of these electronic devices, communication service carriers or device manufacturers are competing to develop electronic devices with differentiated and diversified functionalities. Accordingly, various functions that are provided through electronic devices are evolving more and more.

In general, an electronic device (e.g., a portable terminal) may be used close to the user's body. In this case, since the electromagnetic wave generated by the electronic device may affect the user's body, each country establishes a specific absorption rate (hereinafter, referred to as SAR) standard and defines an electromagnetic wave absorption rate (e.g., an SAR limit) allowable for the electronic device. Each country defines a different SAR standard. For example, for the head/body, Korea and the United States define the allowable electromagnetic wave absorption rate (e.g., the SAR limit) as 1.6 W/kg while Japan defines it as 2 W/kg.

A signal using a wide bandwidth of several GHz in a frequency band of 30 GHz to 300 GHz may be referred to as a millimeter wave (e.g., a millimeter wave signal). Since the millimeter wave is a signal of a high frequency band (e.g., high frequency), it has high permeability to obstacles and high straightness and high accuracy (e.g., time resolution or range resolution) and may thus be used as a radar signal for detecting the surrounding environment.

SUMMARY

The conventional electronic device complies with the SAR standard by reducing the output strength of a communication signal according to a plurality of communication schemes if it is determined by a proximity sensor that the user approaches the electronic device. As the proximity sensor, an infrared (IR) sensor using light having an infrared wavelength may be used. In general, the IR sensor may be positioned at the top of the front surface of the electronic device (e.g., portable terminal). An electronic device using an IR sensor as the proximity sensor outputs light of infrared wavelength using an infrared LED and detects the infrared wavelength of light that is reflected and received from the surface of an object through a photodiode, thereby detecting the presence of the object around the electronic device.

Since such a proximity sensor uses a light source, if a material which cannot transmit light along the path of the light output from the proximity sensor is positioned, such as when a whole display is provided on the front surface of the electronic device or foreign bodies build up on the transmission window, the function of detecting ambient objects using the proximity sensor may malfunction. As the function of detecting the position of ambient objects malfunctions, the control function (e.g., SAR back-off function) of reducing the output strength of wireless communication signals to comply with the SAR standard may not properly work even when the user approaches the electronic device.

The electronic device may include a communication circuit (or communication module) supporting a plurality of wireless communication schemes to perform communication with an external electronic device. For example, as wireless communication schemes, there may be short-range wireless communication schemes, such as wireless fidelity (Wi-Fi) and Bluetooth, or long-range wireless communication schemes, such as cellular networks. According to the conventional SAR backoff function, when the user is positioned within a specific distance (e.g., 8 cm) from the electronic device, the electronic device may collectively apply the SAR backoff function to the plurality of communication schemes, without consideration of the state of each communication scheme. For example, when the user is making a call with the electronic device put close to her face, the SAR backoff function may be applied to cellular communication used for the call like other communication schemes, so that the quality of call through cellular communication may be unnecessarily degraded.

According to various embodiments, an electronic device using a millimeter wave may comprise a communication circuit and at least one processor operatively connected with the communication circuit. The at least one processor may be configured to control the communication circuit to output a first millimeter wave signal in a first strength to an outside of the electronic device, receive a first reflection signal of the first millimeter wave signal reflected by an object positioned around the electronic device, using the communication circuit, identify whether the object is positioned within a first distance from the electronic device, based on the received first reflection signal, determine a strength of a second millimeter wave signal as a second strength corresponding to a second distance which is a distance between the electronic device and the object, in response to identifying that the object is positioned within the first distance, the second distance being smaller than the first distance, and control the communication circuit to output the second millimeter wave signal in the determined second strength to the outside of the electronic device.

According to various embodiments, a method for controlling an electronic device using a millimeter wave may comprise outputting a first millimeter wave signal in a first strength to an outside of the electronic device, receiving a first reflection signal of the first millimeter wave signal reflected by an object positioned around the electronic device, identifying whether the object is positioned within a first distance from the electronic device, based on the received first reflection signal, determining a strength of a second millimeter wave signal as a second strength corresponding to a second distance which is a distance between the electronic device and the object, in response to identifying that the object is positioned within the first distance, the second distance being smaller than the first distance, and outputting the second millimeter wave signal in the determined second strength to the outside of the electronic device.

According to various embodiments, an electronic device using a millimeter wave may comprise a first communication circuit configured to output a millimeter wave signal, a plurality of second communication circuits configured to support a plurality of communication schemes, and at least one processor operatively connected with the first communication circuit and the second communication circuits. The at least one processor may be configured to identify whether an object is positioned within a first distance from the electronic device using the millimeter wave signal and, if the object is identified to be positioned within the first distance, control the plurality of second communication circuits to reduce a strength of at least one wireless communication signal according to at least one wireless communication scheme among a plurality of communication schemes. The at least one wireless communication scheme may be determined based on at least one of priority or a characteristic of an application running on the electronic device Various effects achievable according to the disclosure are not limited by the foregoing effects.

BRIEF DESCRIPTION OF DRAWINGS

The above and other aspects, features, and advantages of certain embodiments of the present disclosure will be more apparent from the following description taken in conjunction with the accompanying drawings, in which:

FIG. 1 is a block diagram illustrating an electronic device in a network environment according to various embodiments;

DETAILED DESCRIPTION

Figure 2A:
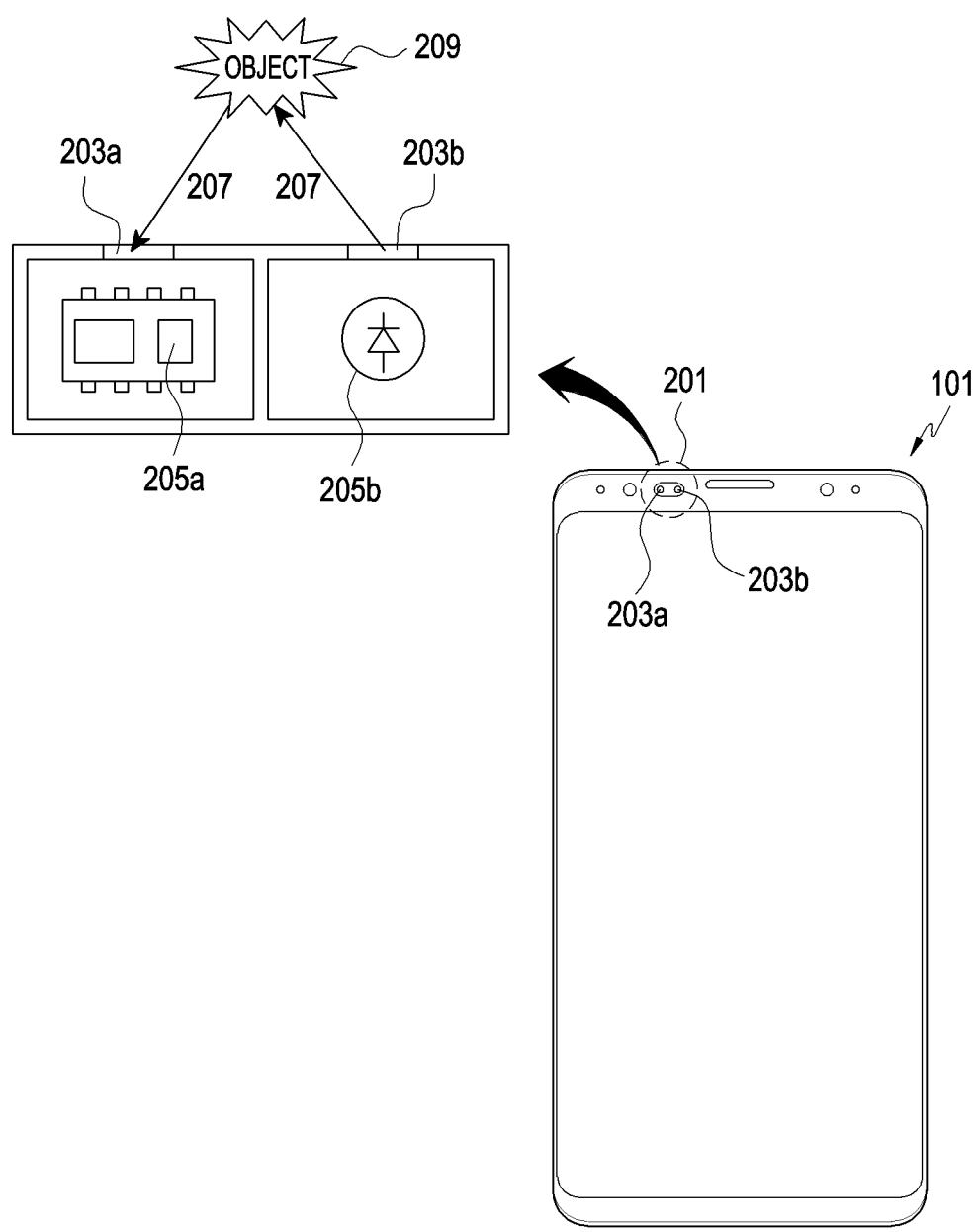
FIG. 2A is an example view for describing a method for detecting approach of an object using an IR sensor of an electronic device according to various embodiments.

According to various embodiments, there may be provided an electronic device capable of more accurately detecting whether the user approaches the electronic device instead of or in aid of the conventional proximity sensor (e.g., an IR sensor) using millimeter wave signals.

The electronic device according to various embodiments may accurately detect whether the user approaches the electronic device (or the distance between the user and the electronic device) based on the millimeter wave signal.

The electronic device according to various embodiments may reduce a malfunction of the SAR backoff function by accurately detecting whether the user approaches the electronic device.

The electronic device according to various embodiments may dynamically apply the SAR backoff function according to priority for each communication scheme. In this case, the millimeter wave signal for detecting whether the user approaches may also be considered when applying the SAR backoff function to comply with the SAR standard.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

FIG. 2A is an example view for describing a method for detecting approach of an object using an IR sensor of an electronic device according to various embodiments.

According to various embodiments, an electronic device 101 may include a proximity sensor (e.g., the sensor module 176 of FIG. 1). As illustrated, the proximity sensor may be an IR sensor 201 that includes a photodiode 205a and an infrared LED 205b. In an environment in which the electronic device 101 is used, since visible light from an external light source (e.g., the sun) may always be incident on the photodiode 205a, the electronic device 101 may include an IR sensor 201 using (near) infrared light to reduce malfunction.

According to various embodiments, near-infrared light (e.g., light having a wavelength of 850 nm, 880 nm, or 940 nm) 207 generated by the infrared LED 205b may be emitted through the transmission window 203b, and the emitted near-infrared light 207 may be reflected by the surface of an adjacent object 209 and be incident on the photodiode 205a through the transmission window 203a. The photodiode 205a may generate an electrical output (e.g., current or voltage) proportional to the strength of the incident near-infrared light 207, and the electronic device 101 (e.g., the processor 120 of FIG. 1) may receive the generated electrical output (e.g., current or voltage) from the photodiode 205a and detect whether the object 209 is positioned within a proximate distance.

However, since the electronic device 101 including the IR sensor 201 needs to drive the photodiode 205a and the infrared LED 205b, it may require high power consumption. If foreign materials are accumulated on the transmission window (e.g., 203a and 203b), the foreign materials may affect the transmission and entry of the near-infrared light 207, and malfunction may occur in the above-described object position detection function. Further, since the amount of infrared reflection varies depending on the surface state (e.g., surface material) of the adjacent object 209, malfunction may occur in the above-described object position detection function.

Figure 2B:
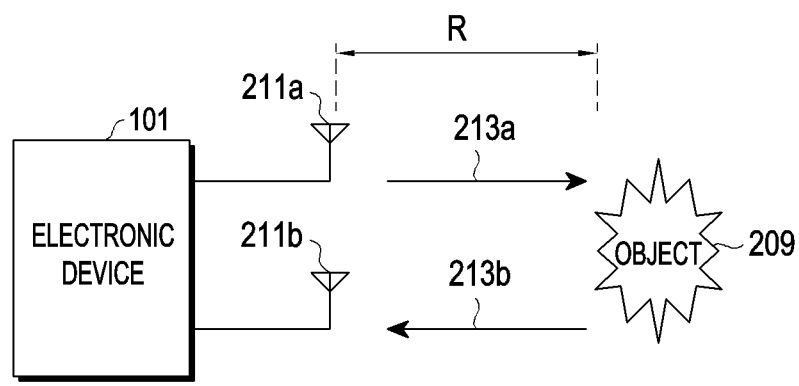
FIG. 2B is an example view for describing a distance estimation method using a millimeter wave of an electronic device according to various embodiments.

FIG. 2B is an example view for describing a distance estimation method using a millimeter wave of an electronic device 101 according to various embodiments.

According to various embodiments, the electronic device 101 may include a first antenna 211a and a second antenna 211b.

According to various embodiments, the electronic device 101 may transmit a signal 213a through the first antenna 211a. For example, the signal 213a may include a millimeter wave (e.g., a signal in a frequency band of 30 GHz to 300 GHz).

According to various embodiments, the electronic device 101 may receive the signal 213b, which is emitted and reflected by the object 209, through the second antenna 211b. For example, the object 209 may include a human or a non-human object. For example, the reflection signal 213b may include a millimeter wave (e.g., a signal in a frequency band of 30 GHz to 300 GHz).

According to various embodiments, the electronic device 101 may detect the time from the transmission of the signal 213a to the reception of the reflection signal 213b. The time from the transmission of the signal 213a to the reception of the reflection signal 213b may be defined as a time-of-flight (ToF).

According to various embodiments, the electronic device 101 may identify the distance R between the electronic device 101 and the object 209 according to Equation 1.

$$R = \frac{\tau \times c}{2} \quad \text{[Equation 1]}$$

In Equation 1, R may mean the distance between the electronic device 101 and the object 209, ti may mean the time-of-flight (ToF), and c may mean the speed $3.0*10^8$ m/s) of the electromagnetic wave. For example, if the time-of-flight is 1 ns, the distance between the electronic device 101 and the object 209 may be 15 cm.

As described above, the electronic device 101 may detect the time-of-flight (ToF) from the difference between the time of transmission of the signal 213a and the time of reception of the reflection signal 213b, determining the distance between the electronic device 101 and the object 209.

Figure 2C:
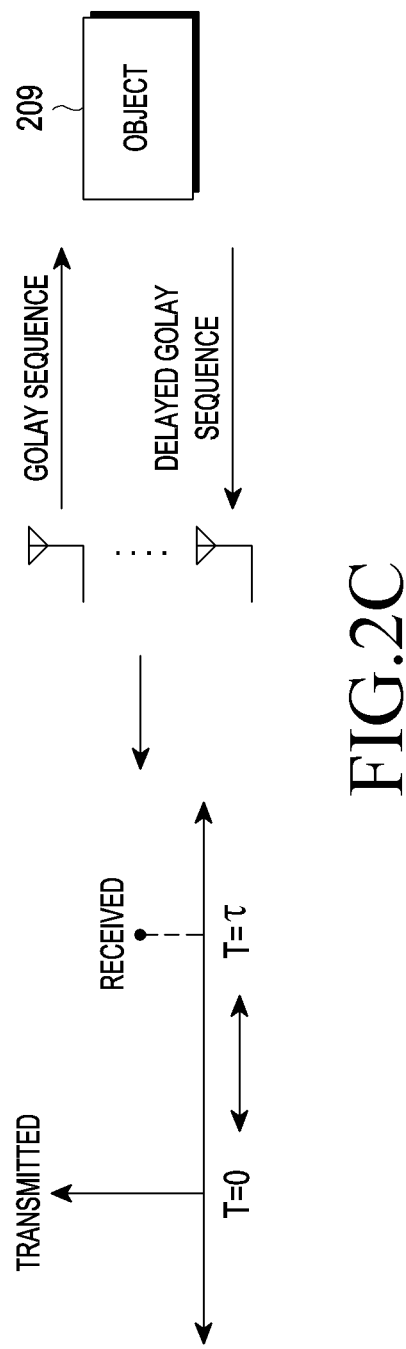
FIG. 2C is an example view for describing a distance estimation method using a millimeter wave of an electronic device according to various embodiments.

FIG. 2C is an example view for describing a distance estimation method using millimeter wave of an electronic device (e.g., the electronic device 101 of FIG. 1) according to various embodiments.

According to various embodiments, an example in which the electronic device 101 to which the 802.11ay standard is applied is utilized for a radar function is illustrated in FIG. 2C.

According to various embodiments, the electronic device 101 may output a signal (e.g., the signal 213a of FIG. 2B) including a Golay sequence to the outside of the electronic device 101. The Golay sequence may include a pair of complementary sequences. The electronic device 101 may receive a reflection signal (e.g., the reflection signal 213b of FIG. 2B) reflected from the object 209. The reflection signal may be a signal delayed by τ. The electronic device 101 may calculate an autocorrelation value (e.g., channel impulse response) of the Golay sequence for the received reflection signal. The electronic device 101 may calculate the autocorrelation value (e.g., channel impulse response (CIR)) of the Golay sequence for the received reflection signal and may identify the time-of-flight τ by comparing the peak value of the autocorrelation value for the output signal at the time when the signal is output and the peak value of the autocorrelation value for the reflection signal. The electronic device 101 may identify the distance R between the electronic device 101 and the object 209 according to the identified time-of-flight and Equation 1 described above. The CIR may further include information regarding the amplitude and phase of the reflection signal 213b.

According to various embodiments, a resolution obtainable when the electronic device 101 to which the above-described 802.11ay standard is applied is utilized for radar function may be calculated according to Equation 2.

$$\text{Resolution} = \frac{T_c}{2} \times c \quad \text{[Equation 2]}$$

In Equation 2, Resolution may mean the resolution as the radar function, $T_c$ may mean the chip duration when the Golay sequence is transmitted, and c may mean the speed of electromagnetic waves (e.g., the speed of light) $3.0*10^8$ m/s). Due to the duality of the time domain and the frequency domain, the chip duration may be proportional to the reciprocal of the bandwidth. Accordingly, in the case of the electronic device 101 to which the 802.11ay standard using a wide bandwidth of several GHz is applied (e.g., the electronic device 101 using a millimeter wave), the chip duration may become smaller than nano-second unit, and it is possible to obtain a high resolution of a centimeter level according to Equation 2. Accordingly, the electronic device 101 using the millimeter wave according to various embodiments may provide high accuracy in face recognition, gesture recognition, or proximity recognition.

According to various embodiments, the electronic device 101 may identify whether the object 209 approaches using a communication circuit (e.g., the communication module 190 of FIG. 1) configured to output a signal 213a (e.g., a millimeter wave signal). For example, the electronic device 101 may replace the IR sensor 201 using the above-described communication circuit (e.g., the communication module 190 of FIG. 1) as a proximity sensor. To increase the accuracy of the above-described proximity detection function, the electronic device 101 may identify the distance to the object 209 using the IR sensor 201 and the communication circuit (e.g., the communication module 190 of FIG. 1) together.

Figure 2D:
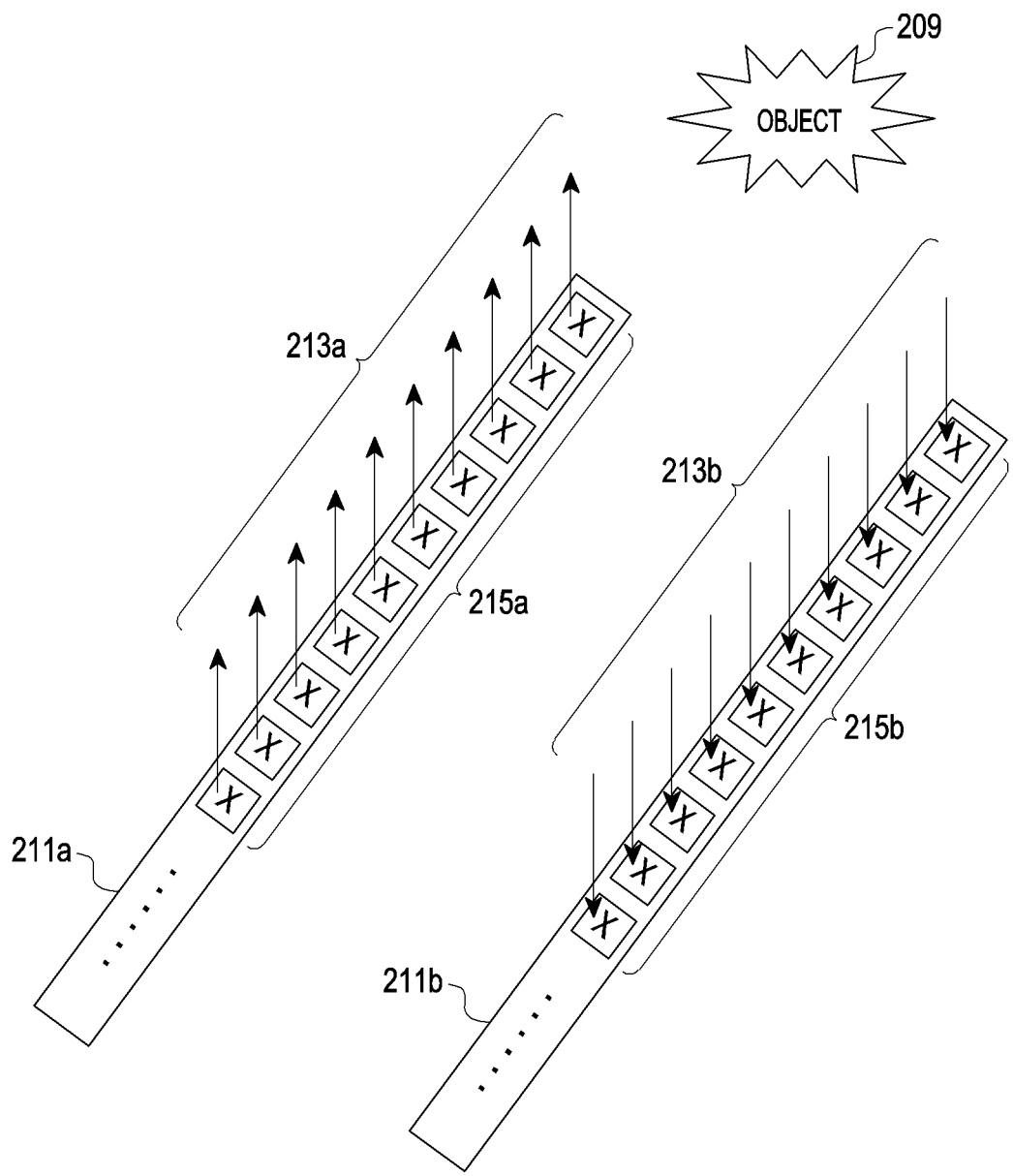
FIG. 2D is an example view for describing an antenna array of an electronic device according to various embodiments.

FIG. 2D is an example view for describing an antenna array of an electronic device 101 according to various embodiments.

According to various embodiments, a first antenna 201a and a second antenna 201b may include an array antenna including a plurality of antenna elements (e.g., first antenna elements 215a or second antenna elements 215b). Each of the antenna elements may include at least one of a patch antenna, a loop antenna, or a dipole antenna.

According to various embodiments, the first antenna 201a may form a directional signal (or radiation pattern) by outputting signals 213a generated by the communication circuit (e.g., the communication module 190 of FIG. 1) through the first antenna elements 215a simultaneously or at certain time intervals. For example, the electronic device 101 may perform beamforming by shifting the phase of each of the signals input to the first antenna elements 215a and/or by adjusting the amplitude of each signal and may use a beamforming method of analog beamforming, digital beamforming, or hybrid beamforming, but the type thereof is not limited. The communication circuit (e.g., the communication module 190) may include a millimeter wave communication circuit capable of transmitting or receiving millimeter waves through the first and second antennas 211a and 211b. The communication circuit (e.g., the communication module 190) may perform communication for transmitting or receiving data with an external electronic device (e.g., the electronic device 102 or 104 or the server 108 of FIG. 1) using millimeter waves.

According to various embodiments, the second antenna 211b may receive the reflection signals 213b, which are the signals 213a transmitted from the first antenna 211a and reflected by the object 209, through the second antenna elements 215b.

According to various embodiments, the first antenna 211a and the second antenna 211b may not necessarily be implemented as antenna arrays physically separated from each other. For example, the above-described first and second antennas 211a and 211b may be implemented as a single integrated antenna array to transmit signals through some of the antenna elements included in the antenna array and receive reflection signals through others of the antenna elements.

As described above, when an antenna array composed of a plurality of antenna elements is utilized, information regarding the angle of arrival (AoA) and the angle of departure (AoD) may be obtained in addition to information regarding the time-of-flight (ToF), amplitude, and phase that may be obtained using a single antenna. Further, it is also possible to provide the function capable of recognizing the human face (e.g., face authentication function) or gesture as well as the function capable of estimating, e.g., the distance or direction or moving direction or speed of various objects by receiving a plurality of reflection signals and analyzing the reception pattern of the reflection signals.

Figure 3:
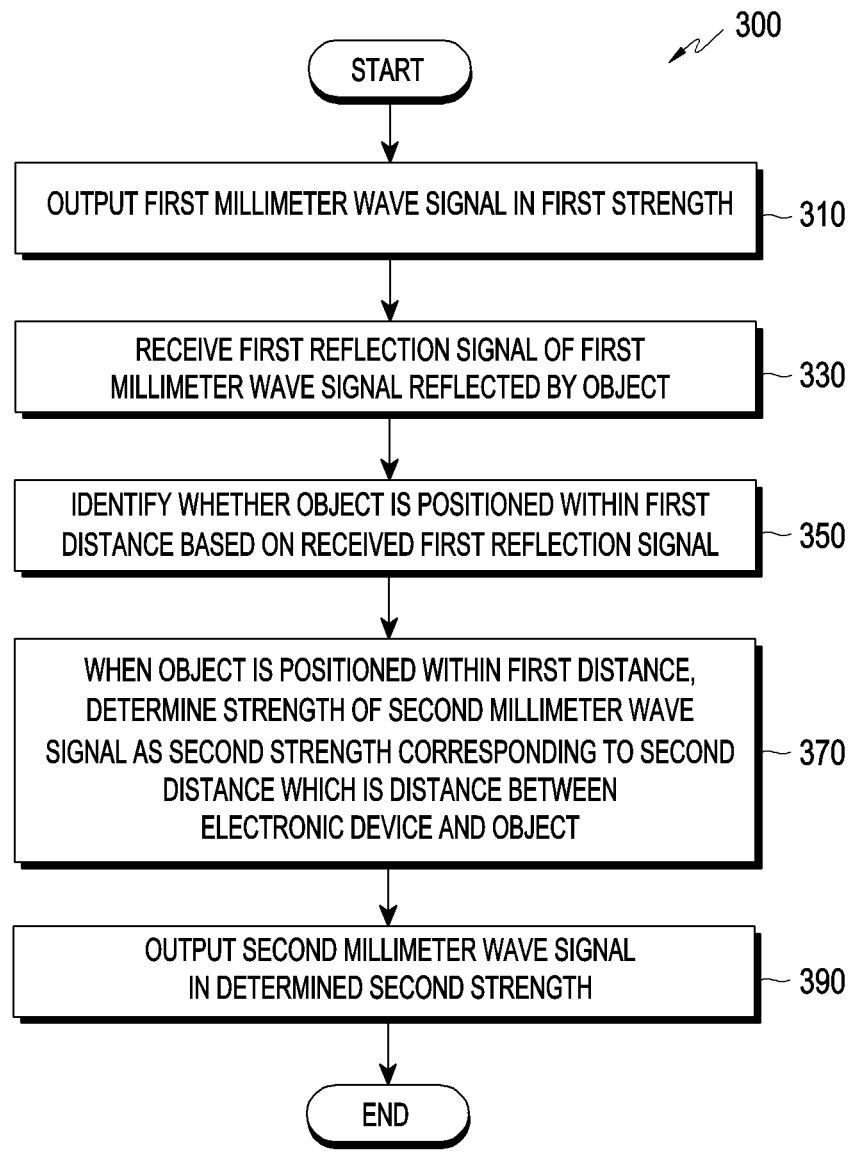
FIG. 3 is a flowchart illustrating an operation method of an electronic device according to various embodiments.

FIG. 3 is a flowchart 300 for describing an operation method of an electronic device (e.g., the electronic device 101 of FIG. 1) according to various embodiments.

According to various embodiments, in operation 310, the electronic device 101 may output a first millimeter wave signal (e.g., the signal 213a of FIG. 2B) in a first strength. The electronic device 101 may include a communication circuit (e.g., the communication module 190 of FIG. 1) configured to transmit millimeter wave signals. The electronic device 101 may control the communication circuit (e.g., the communication module 190 of FIG. 1) to output the first millimeter wave signal (e.g., the signal 213a of FIG. 2B) in the first strength. The first strength may be a strength having a value fixed regardless of the distance between the electronic device 101 and the object (e.g., the object 209 of FIG. 2A). The electronic device 101 may output the first millimeter wave signal (e.g., the signal 213a of FIG. 2B) in a specific direction (e.g., a direction perpendicular to the display) through the antenna array (e.g., the first antenna 201a of FIG. 2D).

According to various embodiments, in operation 330, the electronic device 101 may receive a first reflection signal (e.g., the reflection signal 213b of FIG. 2B) of the first millimeter wave signal (e.g., the signal 213a of FIG. 2B) reflected by the object (e.g., the object 209 of FIG. 2A). The electronic device 101 may receive the first reflection signal (e.g., the reflection signal 213b of FIG. 2B) through the antenna array (e.g., the second antenna 201b of FIG. 2D).

According to various embodiments, in operation 350, the electronic device 101 may identify whether the object (e.g., the object 209 of FIG. 2A) is positioned within a first distance (e.g., 8 cm) based on the received first reflection signal (e.g., the reflection signal 213b of FIG. 2B). According to various embodiments, the first distance may also be denoted as a proximate distance. For example, the electronic device 101 may identify the time (e.g., the time-of-flight of FIG. 2B) from the time of transmission of the first millimeter wave signal (e.g., the signal 213a of FIG. 2B) to the time of reception of the reflection signal 213b or identify the time-of-flight (e.g., the time-of-flight τ of FIG. 2C) from the channel impulse response (CIR) of the first reflection signal (e.g., the reflection signal 213b of FIG. 2B) and may calculate the distance between the electronic device 101 and the object (e.g., the object 209 of FIG. 2A) through Equation 1. The electronic device 101 may compare the distance between the electronic device 101 and the object (e.g., the object 209 of FIG. 2A) with a preset first distance (e.g., 8 cm), and identify whether the object (e.g., the object 209 of FIG. 2A) is positioned within the first distance (e.g., 8 cm). According to various embodiments, the distance between the electronic device 101 and the object (e.g., the object 209 of FIG. 2A) may be referred to as a second distance.

According to various embodiments, in operation 370, when the object (e.g., the object 209 of FIG. 2A) is positioned within the first distance (e.g., 8 cm), the electronic device 101 may determine the strength of the second millimeter wave signal (e.g., the signal 213a of FIG. 2B) as a second strength corresponding to second distance between the electronic device 101 and the object. For example, if it is identified that the calculated second distance is smaller than the first distance (e.g., 8 cm), the electronic device 101 may determine that the strength for outputting the second millimeter wave signal (e.g., the signal 213a of FIG. 2B) corresponds to (e.g., proportional to) the second distance. The second strength may be different from the first strength (e.g., the strength of the first millimeter wave signal). For example, the second strength may be smaller than the first strength. The strength of the first and second millimeter wave signals or the strength of the wireless communication signal described in various embodiments may mean the magnitude of the power applied to the antenna (e.g., the first antenna 201a of FIG. 2B) of the electronic device 101 to output a signal. The second millimeter wave signal (e.g., the signal 213a of FIG. 2B) may be a signal to identify whether the object (e.g., the object 209 of FIG. 2A) identified to be positioned within the first distance (e.g., 8 cm) moves within the first distance (e.g., 8 cm) or to a position exceeding the first distance (e.g., 8 cm). A method for determining the second strength is described in greater detail with reference to other drawings.

According to various embodiments, in operation 390, the electronic device 101 may output a second millimeter wave signal (e.g., the signal 213a of FIG. 2B) in a determined second strength. The electronic device 101 may control the communication circuit (e.g., the communication module 190 of FIG. 1) to output the second millimeter wave signal (e.g., the signal 213a of FIG. 2B). The electronic device 101 may output the second millimeter wave signal (e.g., the signal 213a of FIG. 2B) in a specific direction (e.g., a direction perpendicular to the display) through the antenna array (e.g., the second antenna 201b of FIG. 2D).

In the above paragraphs, it has been described that the distance (e.g., the second distance) between the electronic device 101 and the object (e.g., the object 209 of FIG. 2A) is identified (or calculated) using the first millimeter wave signal. However, in the case where the electronic device 101 includes a proximity sensor (e.g., the IR sensor 201 of FIG. 2A), it is possible to identify (or calculate) the distance (e.g., the second distance) between the electronic device 101 and the object (e.g., the object 209 of FIG. 2A) based on data (or an electrical signal) obtained from the proximity sensor (e.g., the sensor module 176 of FIG. 1) and the first reflection signal (e.g., the reflection signal 213b of FIG. 2B).

In the above paragraphs, the output strength of the first and second millimeter wave signals (e.g., the signal 213a of FIG. 2B) may be adjusted (or reduced) to comply with the SAR standard described in various embodiments. For example, the first and second millimeter wave signals (e.g., the signal 213a of FIG. 2B) are signals of a frequency band of 30 GHz to 300 GHz, and it may be needed to apply the SAR backoff function thereto so as to fit the SAR standard along with the SAR values generated by the wireless communication signal according to the wireless communication scheme supported by the electronic device 101 (e.g., so that the sum of the SAR values is the SAR limit (e.g., 1.6 W/kg) or less).

Figure 4:
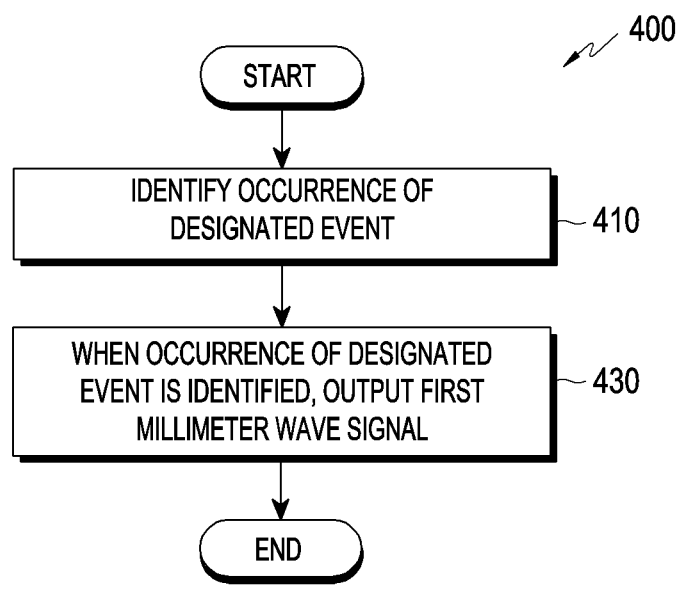
FIG. 4 is a flowchart illustrating an operation method of an electronic device according to various embodiments.

FIG. 4 is a flowchart 400 for describing an operation method of an electronic device (e.g., the electronic device 101 of FIG. 1) according to various embodiments.

According to various embodiments, in operation 410, the electronic device 101 may identify that an event occurs. For example, the event may include at least one of execution of a predesignated application or acquisition of data of a reference value (threshold) or more from at least one sensor (e.g., the sensor module 176 of FIG. 1).

For example, the predesignated application may include an application using a wireless communication scheme supported by the electronic device 101. For example, the wireless communication scheme may include at least one of cellular communication (e.g., 3G communication, 4G communication, or 5G communication) or short-range wireless communication (e.g., Bluetooth, Bluetooth low energy (BLE), infrared data association (IrDA), or near-field communication (NFC), Wi-Fi, or Wi-Fi direct). For example, the application using the wireless communication scheme may include a call application or text application using cellular communication or an Internet application or messenger application using short-range wireless communication (e.g., Wi-Fi). The above-described applications are merely described as examples and may include other various applications running on the electronic device 101 using a wireless communication scheme. Here, the applications running on the electronic device 101 may include not only the applications running in the foreground of the electronic device 101 but also the applications running in the background of the electronic device 101.

According to various embodiments, in the electronic device 101, at least one sensor (e.g., the sensor module 176 of FIG. 1) may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The reference value may be a preset value for each of at least one sensor (e.g., the sensor module 176 of FIG. 1) included in the electronic device 101. For example, when the sensor is a grip sensor, obtaining data of the reference value (threshold) or more may mean that an electrical signal having a strength of a preset value or more generated by the pressure applied to the housing of the electronic device 101 by the user (e.g., a hand) is received from the grip sensor to the processor (e.g., the processor 120 of FIG. 1). The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to various embodiments, in operation 430, the electronic device 101 may output a first millimeter wave signal (e.g., the signal 213a of FIG. 2B) when the occurrence of an event is identified. After operation 430, the electronic device 101 may perform operations 330 to 390 of FIG. 3 described above. Alternatively, when the electronic device 101 is configured to support a plurality of wireless communication schemes, the electronic device 101 may perform operations 330 to 350 and then determine the strength (e.g., output strength) of wireless communication signals according to at least one wireless communication scheme among the plurality of wireless communication schemes.

Figures 5A, 5B:
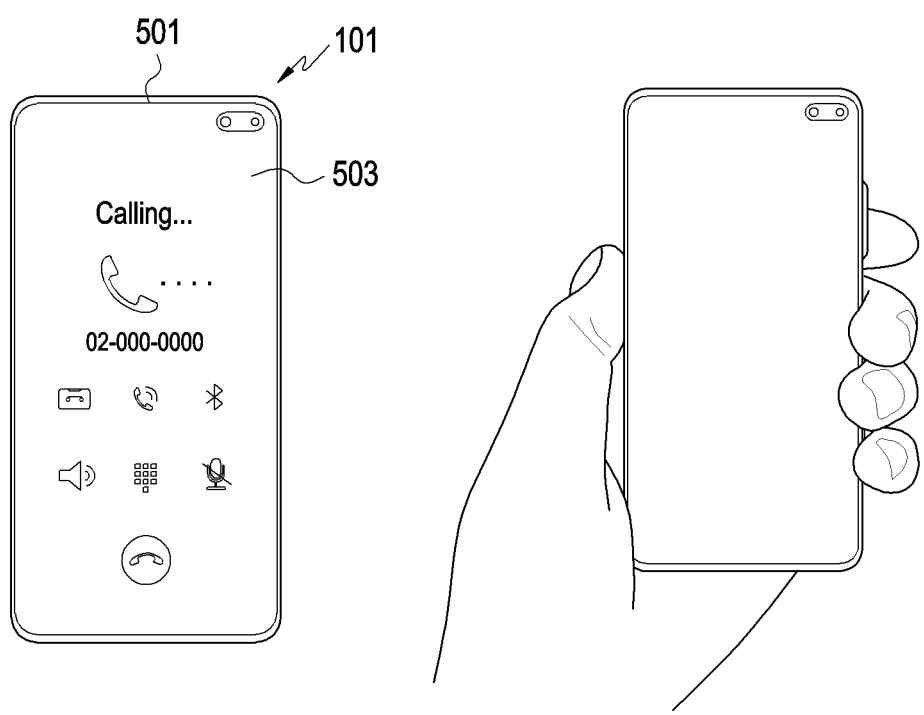
FIG. 5A is an example view for describing an event occurring in an electronic device according to various embodiments.
FIG. 5B is an example view for describing an event occurring in an electronic device according to various embodiments.

FIG. 5A is an example view for describing an event occurring in an electronic device 101 according to various embodiments. FIG. 5B is an example view for describing an event occurring in an electronic device 101 according to various embodiments.

Referring to FIG. 5A, a call application is illustrated as an example of the predesignated application described in FIG. 4.

According to various embodiments, the electronic device 101 may receive a call from an external electronic device (e.g., the electronic device 102 or 104 or the server 108 of FIG. 1). While the electronic device 101 receives a call from the external electronic device (e.g., the electronic device 102 or 104 or the server 108 of FIG. 1), a call application related to cellular communication may be executed on the electronic device 101. Accordingly, an execution screen 503 of the call application may be displayed on the display 501 (e.g., the display device 160 of FIG. 1) of the electronic device 101. The execution screen 503 of the call application may represent that a call is being received by the electronic device 101.

According to various embodiments, the electronic device 101 may identify the execution of the call application related to cellular communication as an event and, in response thereto, may output a first millimeter wave signal (e.g., the signal 213a of FIG. 2B).

Referring to FIG. 5B, as an example of the at least one sensor described in FIG. 4, a grip sensor is illustrated.

According to various embodiments, the display 501 of the electronic device 101 may be in an off state. The off state of the display 501 may mean a state in which the display 501 does not output a screen in a sleep state (e.g., a low power state). When a pressure equal to or larger than a predetermined strength is applied to the housing of the electronic device 101 by the user's hand, the electronic device 101 may receive, from the grip sensor, an electrical signal having a strength larger than or equal to a preset value generated according to the pressure larger than or equal to the predetermined strength.

According to various embodiments, the electronic device 101 (or the processor 120 of FIG. 1) may identify reception of an electrical signal having a strength of a preset value or more from the grip sensor (e.g., the sensor module 176 of FIG. 1) as an event and, in response thereto, output the first millimeter wave signal (e.g., the signal 213a of FIG. 2B).

According to various embodiments, in response to reception of the above-described electrical signal from the grip sensor, the electronic device 101 may execute (e.g., activate) the SAR backoff function without outputting the first millimeter wave signal (e.g., the signal 213a of FIG. 2B).

In the above paragraphs, the case where the display 501 of the electronic device 101 is in the off state has been described above. However, the same description may apply even when the display 501 is in an on state. The on state of the display 501 may mean a state in which the display 501 is activated and a screen is displayed on the display 501.

Figure 6:
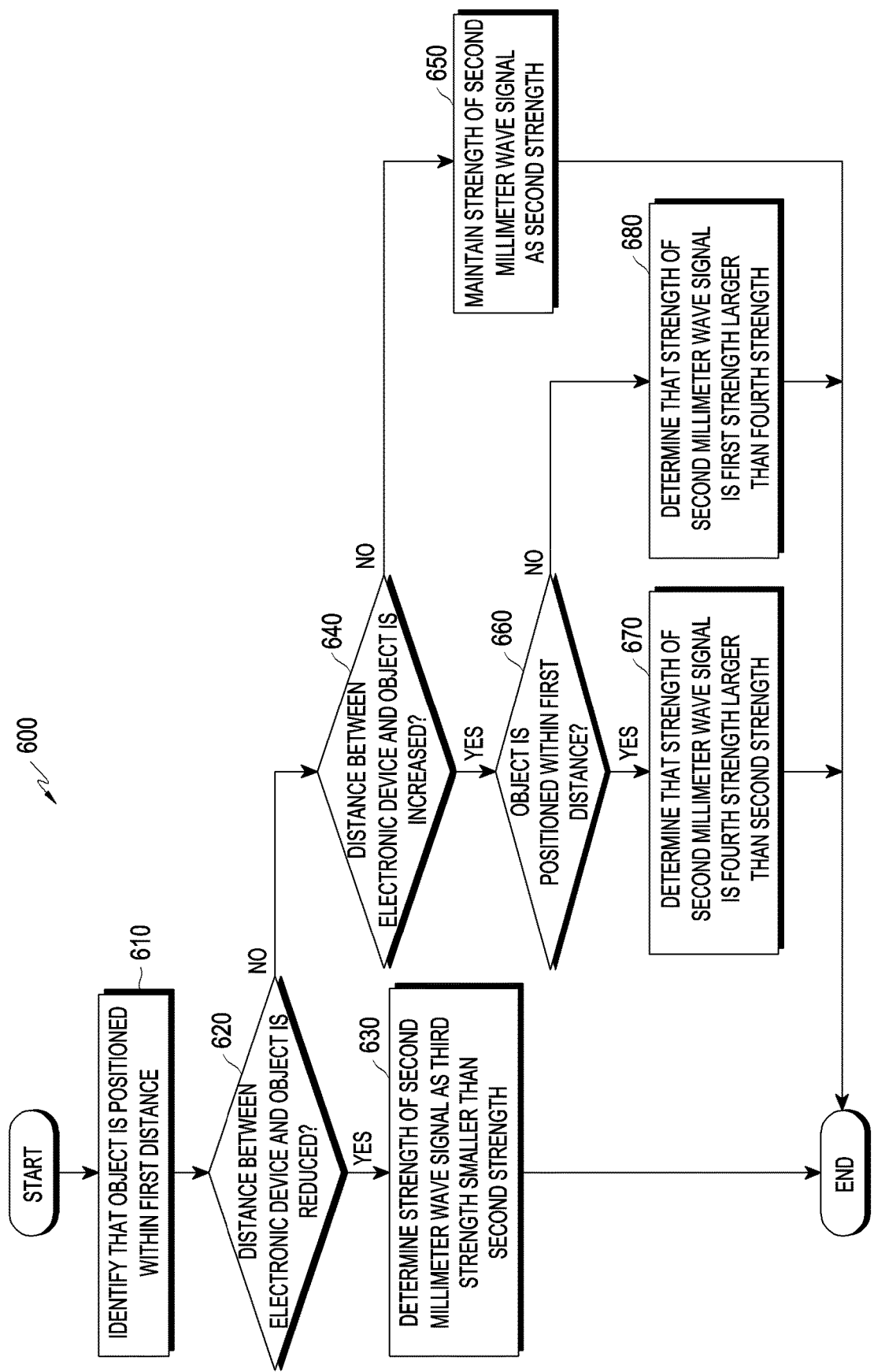
FIG. 6 is a flowchart illustrating an operation method of an electronic device according to various embodiments.

FIG. 6 is a flowchart 600 for describing an operation method of an electronic device (e.g., the electronic device 101 of FIG. 1) according to various embodiments.

According to various embodiments, in operation 610, the electronic device 101 may identify that the object (e.g., the object 209 of FIG. 2A) is positioned within a first distance (e.g., 8 cm). The electronic device 101 may repeatedly and/or periodically transmit a second millimeter wave signal (e.g., the signal 213a of FIG. 2B) in a second strength (e.g., the second strength of FIG. 3) based on identifying that the object (e.g., the object 209 of FIG. 2A) is positioned within the first distance (e.g., 8 cm).

According to various embodiments, in operation 620, the electronic device 101 may identify whether the distance between the electronic device 101 and the object (e.g., the object 209 of FIG. 2A) decreases. For example, the electronic device 101 may transmit the second millimeter wave signal (e.g., the signal 213a of FIG. 2B) and receive a second reflection signal (e.g., the reflection signal 213b of FIG. 2B) which is the second millimeter wave signal (e.g., the signal 213a of FIG. 2B) reflected by the object (e.g., the object 209 of FIG. 2A). The electronic device 101 may identify whether the distance between the electronic device 101 and the object (e.g., the object 209 of FIG. 2A) decreases by comparing the distance (e.g., the third distance) between the electronic device 101 and the object (e.g., the object 209 of FIG. 2A) calculated based on the second reflection signal (e.g., the reflection signal 213b of FIG. 2B) with the distance (e.g., the second distance of FIG. 3) calculated at the time of reception of the first reflection signal (e.g., the reflection signal 213b of FIG. 2B).

According to various embodiments, if it is identified that the distance between the electronic device 101 and the object (e.g., the object 209 of FIG. 2A) decreases, the electronic device 101 may determine the strength of the second millimeter wave signal (e.g., the signal 213a of FIG. 2B) as the third strength being smaller than the second strength in operation 630. For example, the electronic device 101 may repeatedly and/or periodically transmit the second millimeter wave signal (e.g., the signal 213a of FIG. 2B) in the second strength, track the distance of the position of the moved object (e.g., the object 209 of FIG. 2A) based on the reflection signal (e.g., the reflection signal 213b of FIG. 2B) repeatedly and/or periodically received accordingly, and identify whether the third distance (e.g., the distance changed from the second distance) of the object (e.g., the object 209 of FIG. 2A) is smaller than the second distance (e.g., the distance calculated upon reception of the first reflection signal). In this case, the electronic device 101 may change (e.g., reduce) the strength (e.g., output strength) of the second millimeter wave signal (e.g., the signal 213a of FIG. 2B), which used to be output in the second strength, into the third strength and output it. The third strength may be a strength smaller than the second strength and, as the third distance (e.g., the tracked distance of the object) changes, it may be dynamically changed (e.g., reduced) to correspond to (e.g., proportional to) the changed third distance.

According to various embodiments, if it is identified that the distance between the electronic device 101 and the object (e.g., the object 209 of FIG. 2A) is not reduced, the electronic device 101 may identify whether the distance between the electronic device 101 and the object (e.g., the object 209 of FIG. 2A) is increased in operation 640.

According to various embodiments, if it is identified that the distance between the electronic device 101 and the object (e.g., the object 209 of FIG. 2A) is not increased (or if the difference between the distance identified in operation 610 and the distance identified in operation 620 or operation 640 is a preset value (e.g., 1 cm) or less), the electronic device 101 may maintain the output strength of the second millimeter wave signal as the second strength in operation 650.

According to various embodiments, if it is identified that the distance between the electronic device 101 and the object (e.g., the object 209 of FIG. 2A) is increased, the electronic device 101 may identify whether the object (e.g., the object 209 of FIG. 2A) is positioned within the first distance (e.g., the first distance of FIG. 3) in operation 660. The electronic device 101 may identify whether the calculated third distance is the first distance or less.

According to various embodiments, if it is identified that the object (e.g., the object 209 of FIG. 2A) is positioned within the first distance (e.g., the first distance of FIG. 3), the electronic device 101 may determine that the strength of the second millimeter wave signal (e.g., the signal 213a of FIG. 2B) is a fourth strength that is larger than the second strength in operation 670. For example, the electronic device 101 may track the third distance of the object (e.g., the object 209 of FIG. 2A) according to the second millimeter wave signal (e.g., the signal 213a of FIG. 2B) repeatedly and/or periodically transmitted in the second strength and, if the third distance larger than the second distance is identified to be the first distance or less, change (e.g., increase) the strength of the second millimeter wave signal (e.g., the signal 213a of FIG. 2B), which used to be output in the second strength, into the fourth strength and output it. The fourth strength may be a strength larger than the second strength and, as the third distance (e.g., the tracked distance of the object) changes, it may be dynamically changed (e.g., increased) to correspond to (e.g., proportional to) the changed third distance.

According to various embodiments, if it is identified that the object (e.g., the object 209 of FIG. 2A) is not positioned within the first distance (e.g., the first distance of FIG. 3), the electronic device 101 may determine that the strength of the second millimeter wave signal (e.g., the signal 213a of FIG. 2B) is the first strength (e.g., the first strength of FIG. 3) that is larger than the fourth strength in operation 680. For example, if the tracked third distance is identified to be the first distance or more according to the second millimeter wave signal (e.g., the signal 213a of FIG. 2B) repeatedly and/or periodically transmitted in the second strength, the electronic device 101 may change (e.g., increase) the strength (e.g., output strength) of the second millimeter wave signal (e.g., the signal 213a of FIG. 2B), which used to be output in the second strength, into the first strength and output it. The first strength may be a strength larger than the second strength and the fourth strength and, although the third distance (e.g., the tracked distance of the object) which is the first distance or more is changed, it may be a strength having a fixed value which is not changed (e.g., reduced or increased). The first strength may be the same strength as the strength (e.g., the first strength of FIG. 3) of the first millimeter wave signal (e.g., the signal 213a of FIG. 2B) described in various embodiments.

Figure 7:
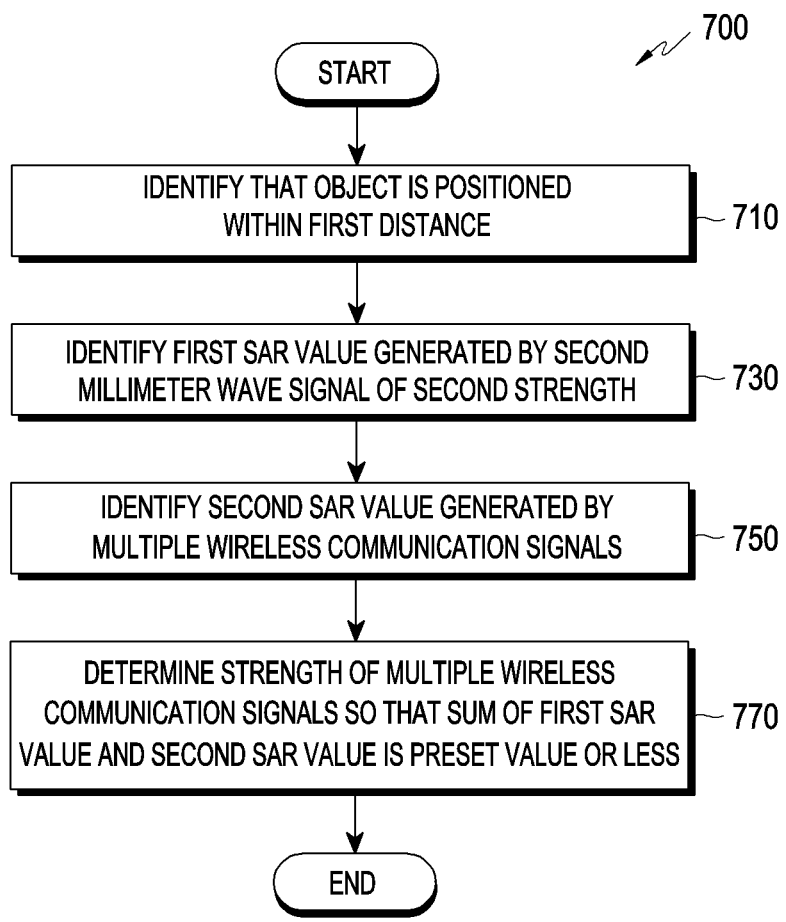
FIG. 7 is a flowchart illustrating an operation method of an electronic device according to various embodiments.

FIG. 7 is a flowchart 700 for describing an operation method of an electronic device (e.g., the electronic device 101 of FIG. 1) according to various embodiments.

According to various embodiments, in operation 710, the electronic device 101 may identify that the object (e.g., the object 209 of FIG. 2A) is positioned within a first distance (e.g., the first distance of FIG. 3). In this case, the electronic device 101 may determine the strength of the second millimeter wave signal to be output, as the second strength.

According to various embodiments, in operation 730, the electronic device 101 may identify a first SAR value generated by a second millimeter wave signal of the second strength. For example, the electronic device 101 may identify the SAR value corresponding to the second strength, using a SAR mapping table stored in the memory (e.g., the memory 130 of FIG. 1). For example, the SAR mapping table may include data recording the SAR value (W/kg) for each strength (dB) generated by the first and second millimeter wave signals and wireless communication signals. For example, the SAR mapping table may include a SAR value (W/kg) for each strength (dB) for each wireless communication scheme. The SAR mapping table may have the same format for each wireless communication scheme. The SAR value (W/kg) may be a previously measured value. The SAR mapping table may be used to dynamically adjust the strength of each of a plurality of wireless communication signals.

According to various embodiments, in operation 750, the electronic device 101 may identify a second SAR value generated by a plurality of wireless communication signals. The plurality of wireless communication signals may include wireless communication signals that may be output according to a plurality of wireless communication schemes supported by the communication circuit (e.g., the communication module 190 of FIG. 1) of the electronic device 101. For example, the plurality of wireless communication schemes may include at least one of cellular communication (e.g., 3G communication, 4G communication, or 5G communication) or short-range wireless communication (e.g., Bluetooth, Bluetooth low energy (BLE), IrDA or NFC, Wi-Fi, or Wi-Fi direct). The electronic device 101 may identify SAR values corresponding to the strength of the wireless communication signal of each of the wireless communication schemes based on the SAR mapping table. The electronic device 101 may identify the second SAR value by summing SAR values of wireless communication signals output using at least some of the plurality of supported wireless communication schemes.

According to various embodiments, in operation 770, the electronic device 101 may determine the strength of the plurality of wireless communication signals so that the sum of the first SAR value and the second SAR value is equal to or less than a preset value. For example, the preset value may be a SAR limit (e.g., 1.6 W/kg) defined in the SAR standard. For example, the electronic device 101 may adjust (e.g., reduce) the strength of the second millimeter wave signal or the strength of at least one of the plurality of wireless communication signals to thereby adjust (e.g., reduce) at least one of the first SAR value or the second SAR value so that the sum of the first SAR value and the second SAR value may be a preset value or less. In this case, which of the plurality of wireless communication signals is to be adjusted (e.g., reduced) at what rate may be determined according to the priority of the plurality of wireless communication schemes, which is described below in greater detail with reference to other drawings.

Figure 8:
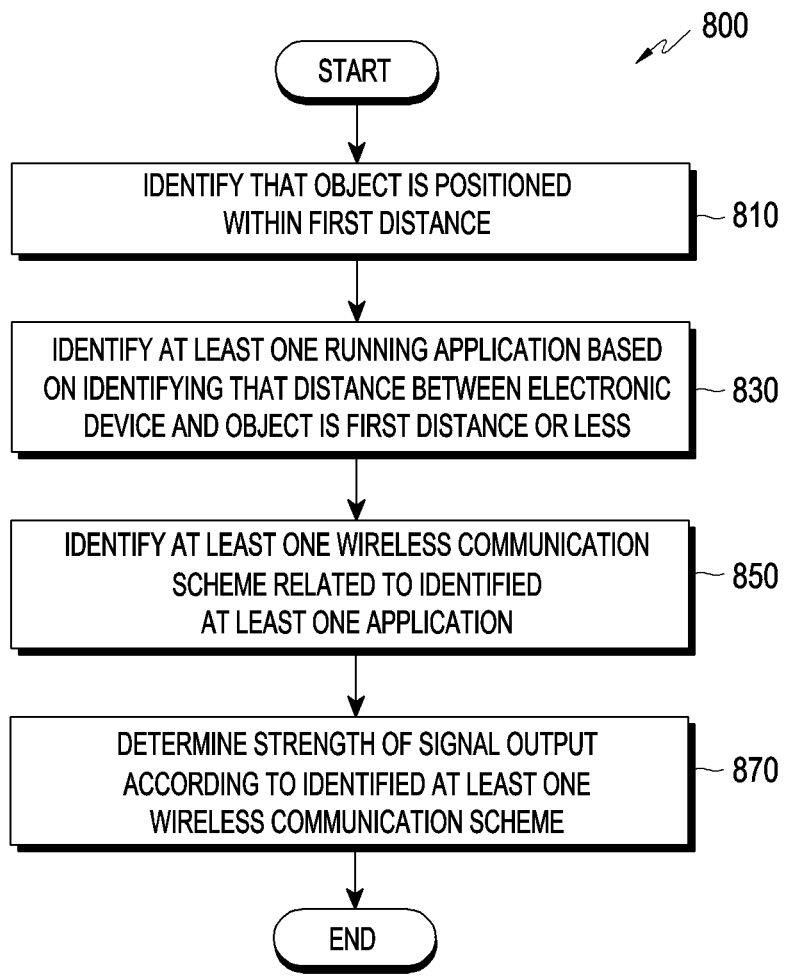
FIG. 8 is a flowchart illustrating an operation method of an electronic device according to various embodiments.

FIG. 8 is a flowchart 800 for describing an operation method of an electronic device (e.g., the electronic device 101 of FIG. 1) according to various embodiments.

According to various embodiments, in operation 810, the electronic device 101 may identify that the object (e.g., the object 209 of FIG. 2A) is positioned within a first distance (e.g., the first distance of FIG. 3).

According to various embodiments, in operation 830, the electronic device 101 may identify at least one running application based on identifying that the distance between the electronic device 101 and the object (e.g., the object 209 of FIG. 2A) is the first distance (e.g., the third distance of FIG. 3) or less. The at least one running application may include at least one application using any one of the plurality of wireless communication schemes supported by the electronic device 101. For example, the at least one running application may be an application running in the foreground and an application running in the background. The at least one running application may be described in the same manner as that for the predesignated application of FIG. 4.

According to various embodiments, in operation 850, the electronic device 101 may identify at least one wireless communication scheme related to at least one identified application. For example, the at least one above-described wireless communication scheme may be a wireless communication scheme currently being used through the identified application. For example, when the identified application is a call application, the related wireless communication scheme may be a cellular communication scheme. For example, when the identified application is an Internet application, the related wireless communication scheme may be a Wi-Fi communication scheme being used through the Internet application.

According to various embodiments, in operation 870, the electronic device 101 may determine the strength of the signal output according to at least one identified wireless communication scheme.

For example, if it is identified that the number of wireless communication schemes related to at least one running application is one (e.g., when only one wireless communication scheme is currently used), the electronic device 101 may determine the strength of the wireless communication signal output according to the identified wireless communication scheme so that the SAR values generated by the wireless communication signal output according to the identified wireless communication scheme and the second millimeter wave signal output in the second strength, respectively, are a preset value (e.g., the preset value of FIG. 7) or less.

For example, if it is identified that the number of wireless communication schemes related to the at least one running application are more than one, the electronic device 101 may determine the priority for the plurality of wireless communication schemes and determine the strength of the wireless communication signal output according to at least one wireless communication scheme among the plurality of wireless communication schemes according to the determined priority.

For example, the priority may be determined based on the characteristics of the application. For example, when a call application and an Internet application are running, the call application may be determined as having a higher priority. The priority determined based on the characteristics of the application may be preset per application and may be applied to the running application.

For example, the priority may be determined based on the execution state of the application. For example, when an Internet application is running in the background, and a call application is running in the foreground in the electronic device 101, the communication scheme used through the call application running in the foreground may be determined as having a higher priority than the communication scheme used through the Internet application running in the background.

According to an embodiment, the electronic device 101 may determine the strength of the wireless communication signal output according to at least one wireless communication scheme according to the determined priority.

For example, if it is identified that the number of wireless communication schemes related to the at least one running application is one, the electronic device 101 may determine the strength of the wireless communication signal output according to one identified wireless communication scheme so that the sum of the first SAR value generated by the second millimeter wave signal and the second SAR value generated by the wireless communication signal output according to the identified wireless communication scheme is a preset value (e.g., the preset value of FIG. 7) or less.

For example, if it is identified that the number of wireless communication schemes related to the at least one running application is more than one, the electronic device 101 may determine the strength of the signal output according to the plurality of identified wireless communication schemes according to the determined priority so that the sum of the first SAR value and the second SAR value generated by the wireless communication signal output according to the plurality of identified wireless communication schemes is a preset value (e.g., the preset value of FIG. 7) or less.

For example, the electronic device 101 may determine that the output strength of wireless communication schemes other than the wireless communication scheme determined as having the highest priority is 0 (in other words, it may disable the output of wireless communication signals according to the other wireless communication schemes).

As another example, the electronic device 101 may determine that the output strength of wireless communication schemes other than the two wireless communication schemes corresponding to the top two priorities is 0. In this case, the strength of the wireless communication signal output according to the wireless communication scheme corresponding to the highest priority may be determined to be reduced by a rate which is smaller than the strength of the wireless communication signal output according to the wireless communication scheme corresponding to the second highest priority. The above-described two priorities are merely an example. According to settings, it is possible to determine the strength of the wireless communication signal output according to a plurality of wireless communication schemes based on three or more priorities.

According to various embodiments, when the strength of the second millimeter wave signal is adjusted (e.g., increased or decreased), the electronic device 101 may determine the strength of the signal output according to at least one identified wireless communication scheme so that the sum of the second SAR value and the first SAR value generated by the second millimeter wave signal having the adjusted strength is a preset value (e.g., the preset value of FIG. 7) or less.

According to various embodiments, at least one of operations 830 to 870 described above may be re-performed according to a change in the operation state of the electronic device 101. For example, after operation 870 is performed, if a new application is further executed or a signal related to a wireless communication scheme is received from an external electronic device (e.g., the electronic device 102 or server 108 of FIG. 1), at least one of the identification of the running application or the determination of the priority for the wireless communication scheme may be performed again.

Figure 9A:
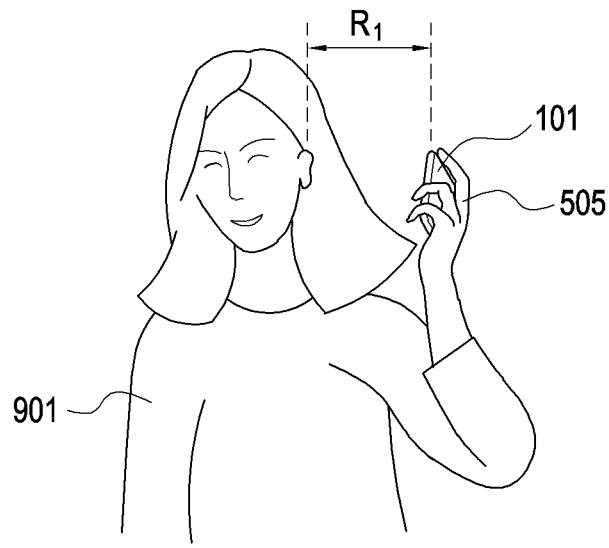
FIG. 9A is an example view for describing an operation method of an electronic device according to a distance between the electronic device and an object, according to various embodiments.
Figure 9B:
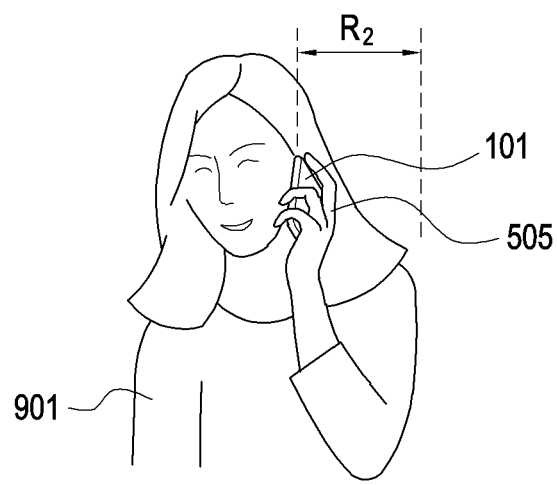
FIG. 9B is an example view for describing an operation method of an electronic device according to a distance between the electronic device and an object, according to various embodiments.

FIG. 9A is an example view for describing an operation method of an electronic device 101 according to a distance between the electronic device 101 and an object (e.g., the object 209 of FIG. 2A), according to various embodiments. FIG. 9B is an example view for describing an operation method of an electronic device 101 according to a distance between the electronic device 101 and an object (e.g., the object 209 of FIG. 2A), according to various embodiments.

Referring to FIG. 9A, a state in which a user 901 is using an electronic device 101 at a longer distance R1 is illustrated. Here, R1 may be a distance larger than the first distance (e.g., 8 cm) of FIG. 3. The user 901 (e.g., a face of the user) may be described as an example of the object 209 of FIG. 2A.

According to various embodiments, the electronic device 101 may identify an event in which a call is received from an external electronic device (e.g., the electronic device 102 or 104 or server 108 of FIG. 1) through communication (e.g., cellular communication) and a predesignated application (e.g., a call application) is executed.

According to various embodiments, when a call application is executed, the electronic device 101 may identify the distance between the user 901 (e.g., the face of the user) and the electronic device 101. The electronic device 101 may repeatedly and/or periodically output a first millimeter wave signal (e.g., the signal 213a of FIG. 2B), identifying whether the user 901 (e.g., the face of the user) is positioned within a first distance (e.g., 8 cm) from the electronic device 101. The electronic device 101 may output the first millimeter wave signal (e.g., the signal 213a of FIG. 2B) having a fixed output strength (e.g., the first strength of FIG. 3) until the user 901 (e.g., the face of the user) is positioned within the first distance (e.g., 8 cm).

Referring to FIG. 9B, a state in which the user 901 is using the electronic device 101 at a shorter distance R2 is illustrated. Here, R2 may be a distance smaller than the first distance (e.g., 8 cm) of FIG. 3.

According to various embodiments, if the user 901 (e.g., the face of the user) is identified as being positioned within the first distance (e.g., 8 cm), the electronic device 101 may repeatedly and/or periodically output the second millimeter wave signal (e.g., the signal 213a of FIG. 2B) in a second strength (e.g., the second strength of FIG. 3). The output strength of the second millimeter wave signal (e.g., the signal 213a of FIG. 2B) may be dynamically changed to correspond to the distance between the electronic device 101 and the user 901 (e.g., the face of the user).

For example, when the distance between the electronic device 101 and the user 901 (e.g., the face of the user) is reduced within the first distance (e.g., when the face of the user approaches the electronic device 101), it is possible to repeatedly and/or periodically identify (e.g., track) the distance between the electronic device 101 and the user 901 (e.g., the face of the user) even with a low strength of second millimeter wave signal (e.g., the signal 213a of FIG. 2B). Thus, the electronic device 101 may determine the strength of the second millimeter wave signal (e.g., the signal 213a of FIG. 2B) as the third strength (e.g., the third strength of FIG. 6) being smaller than the second strength (e.g., the second strength of FIG. 3). When the distance between the electronic device 101 and the user 901 (e.g., the face of the user) increases within the first distance (e.g., the first distance of FIG. 3) (e.g., when the user 901 moves away from the electronic device 101), a high strength of second millimeter wave signal (e.g., the signal 213a of FIG. 2B) is required to repeatedly and/or periodically identify (e.g., track) the distance between the electronic device 101 and the user 901 (e.g., the face of the user). Thus, the electronic device 101 may determine that the strength of the second millimeter wave signal (e.g., the signal 213a of FIG. 2B) is the fourth strength (e.g., the fourth strength of FIG. 6) higher than the third strength (e.g., the third strength of FIG. 6).

According to various embodiments, if the user 901 (e.g., the face of the user) is identified as being positioned within the first distance (e.g., 8 cm), the electronic device 101 may reduce the strength of the wireless communication signal output (or to be output) according to the above-described remaining wireless communication schemes so that the sum of the SAR value (e.g., the second SAR value of FIG. 7) generated by the wireless communication signal according to at least one wireless communication schemes including a cellular communication scheme and the SAR value (e.g., the first SAR value of FIG. 7) generated by the above-described second millimeter wave signal does not exceed the SAR limit (e.g., 1.6 W/kg).

Figure 10:
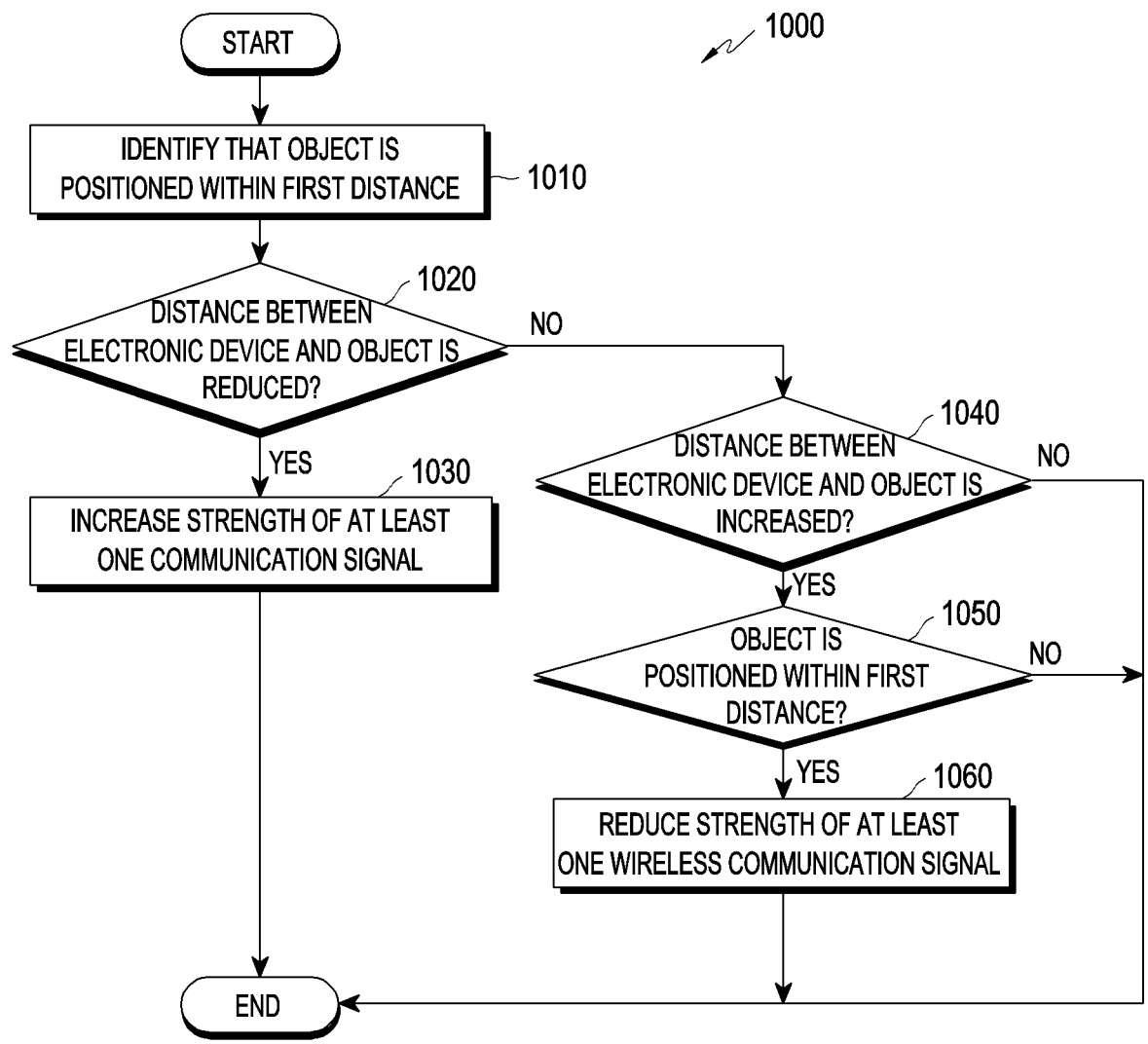
FIG. 10 is a flowchart illustrating an operation method of an electronic device according to various embodiments.

FIG. 10 is a flowchart 1000 for describing an operation method of an electronic device (e.g., the electronic device 101 of FIG. 1) according to various embodiments. What has been described above in connection with FIG. 6 or 7 is briefly described or skipped from the description.

According to various embodiments, in operation 1010, the electronic device 101 may identify that the object (e.g., the object 209 of FIG. 2A) is positioned within a first distance (e.g., the first distance of FIG. 3). The electronic device 101 may repeatedly and/or periodically transmit the second millimeter wave signal (e.g., the signal 213a of FIG. 2B) in the second strength (e.g., the second strength of FIG. 3). The electronic device 101 may reduce the strength of at least some of the plurality of wireless communication signals based on identifying that the distance between the electronic device 101 and the object (e.g., the object 209 of FIG. 2A) is the first distance or less and output the signals.

According to various embodiments, in operation 1020, the electronic device 101 may identify whether the distance between the electronic device 101 and the object (e.g., the object 209 of FIG. 2A) decreases. The electronic device 101 may repeatedly and/or periodically identify the distance between the electronic device 101 and the object (e.g., the object 209 of FIG. 2A) using the second millimeter wave signal (e.g., the signal 213a of FIG. 2B), thereby identifying whether the distance between the electronic device 101 and the object (e.g., the object 209 of FIG. 2A) is reduced within the first distance (e.g., 8 cm).

According to various embodiments, if it is identified that the distance between the electronic device 101 and the object (e.g., the object 209 of FIG. 2A) is reduced, the electronic device 101 may increase the strength of at least one wireless communication signal in operation 1030. For example, the electronic device 101 may increase the strength of at least one wireless communication signal among at least some wireless communication signals whose strength has been reduced in operation 1010. As described above in connection with FIG. 6 or 7, as the distance between the electronic device 101 and the object (e.g., the object 209 of FIG. 2A) is reduced, the electronic device 101 may reduce the strength of the second millimeter wave signal (e.g., the signal 213a of FIG. 2B) from the second strength (e.g., the second strength of FIG. 3) to the third strength (e.g., the third strength of FIG. 6). The electronic device 101 may identify the first SAR value (e.g., the first SAR value of FIG. 7) that is reduced as the strength of the second millimeter wave signal (e.g., the signal 213a of FIG. 2B) is reduced. The electronic device 101 may increase the strength of at least one wireless communication signal based on the reduced first SAR value (e.g., the first SAR value of FIG. 7). The second SAR value (e.g., the second SAR value of FIG. 7) increased as the strength of at least one wireless communication signal increases may have a value identical or corresponding to the reduced first SAR value (e.g., the first SAR value of FIG. 7). The wireless communication signal whose strength is increased may be a wireless communication signal according to at least one of the wireless communication scheme related to one running application of operation 870 of FIG. 8 or the wireless communication scheme having a higher priority based on the determined priority.

According to various embodiments, if it is identified that the distance between the electronic device 101 and the object (e.g., the object 209 of FIG. 2A) is not reduced, the electronic device 101 may identify whether the distance between the electronic device 101 and the object (e.g., the object 209 of FIG. 2A) is increased in operation 1040. When it is identified that the distance between the electronic device 101 and the object (e.g., the object 209 of FIG. 2A) is not increased, the electronic device 101 may end the operations of FIG. 10. In other words, the electronic device 101 may maintain the strength of the second millimeter wave signal (e.g., the signal 213a of FIG. 2B) and the strength of the plurality of wireless communication signals in operation 1010.

According to various embodiments, if it is identified that the distance between the electronic device 101 and the object (e.g., the object 209 of FIG. 2A) is increased, the electronic device 101 may identify whether the object (e.g., the object 209 of FIG. 2A) is positioned within the first distance (e.g., the first distance of FIG. 3) in operation 1050.

According to various embodiments, if it is identified that the object (e.g., the object 209 of FIG. 2A) is positioned within the first distance (e.g., the first distance of FIG. 3), the electronic device 101 may reduce the strength of at least one wireless communication signal in operation 1060. If it is identified that the distance between the electronic device 101 and the object (e.g., the object 209 of FIG. 2A) increases, the electronic device 101 may increase the strength of the second millimeter wave signal (e.g., the signal 213a of FIG. 2B) to the fourth strength (e.g., the fourth strength of FIG. 6). The electronic device 101 may identify the first SAR value (e.g., the first SAR value of FIG. 7) that is increased as the strength of the second millimeter wave signal (e.g., the signal 213a of FIG. 2B) is increased. The electronic device 101 may decrease the strength of at least one wireless communication signal based on the increased first SAR value (e.g., the first SAR value of FIG. 7). The second SAR value (e.g., the second SAR value of FIG. 7) decreased as the strength of at least one wireless communication signal decreases may have a value identical or corresponding to the increased first SAR value (e.g., the first SAR value of FIG. 7). The wireless communication signal whose strength is decreased may be a wireless communication signal according to at least one of the wireless communication scheme related to one running application of operation 870 of FIG. 8 or the wireless communication scheme having a lower priority based on the determined priority.

Figure 11:
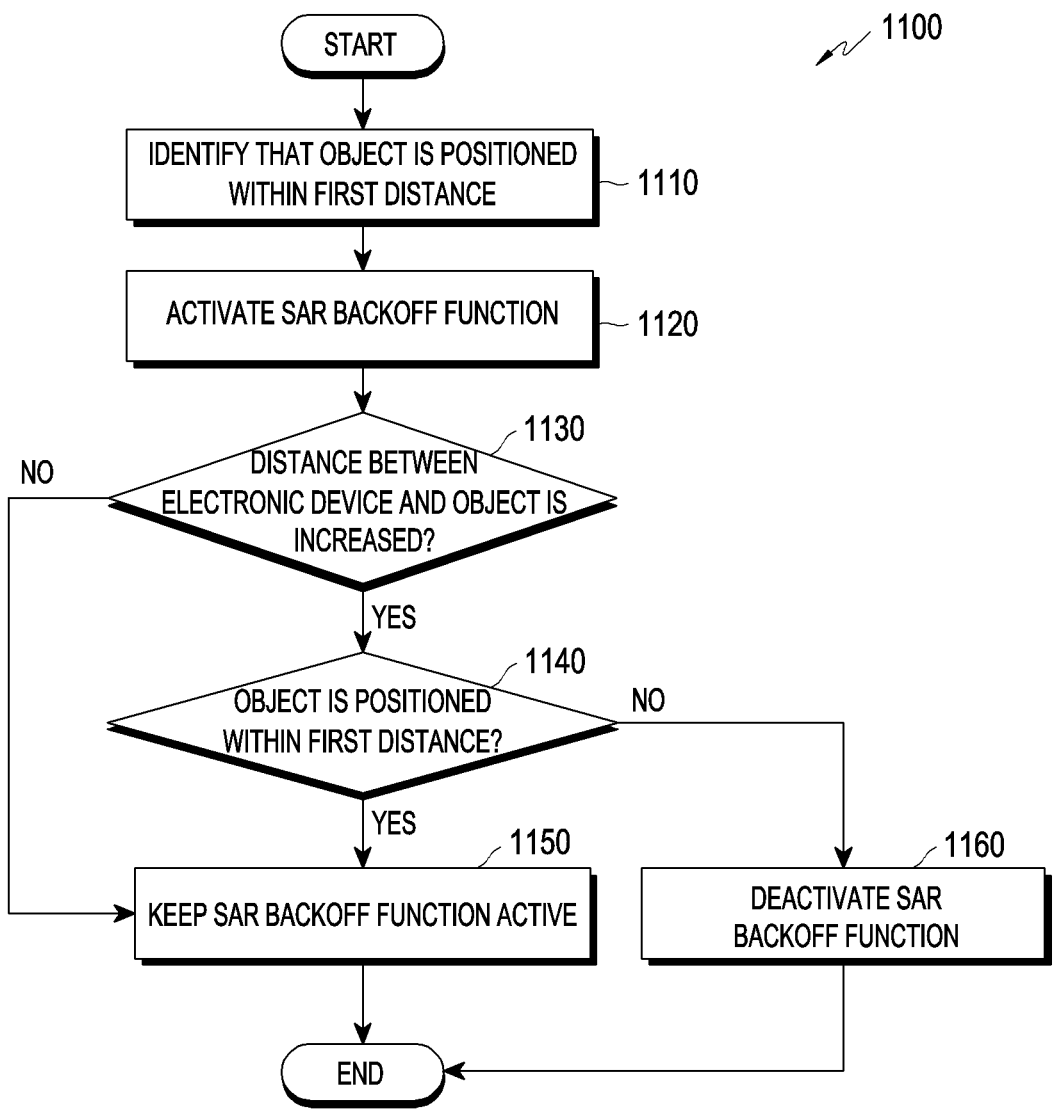
FIG. 11 is a flowchart illustrating an operation method of an electronic device according to various embodiments.

FIG. 11 is a flowchart 1100 for describing an operation method of an electronic device (e.g., the electronic device 101 of FIG. 1) according to various embodiments.

According to various embodiments, in operation 1110, the electronic device 101 may identify that the object (e.g., the object 209 of FIG. 2A) is positioned within a first distance (e.g., the first distance of FIG. 3).

According to various embodiments, in operation 1120, the electronic device 101 may activate a SAR backoff function. The SAR backoff function may mean the function of adjusting (or reducing) the output strength of at least one wireless communication signal or the second millimeter wave signal (e.g., the signal 213a of FIG. 2B) so that the sum of the SAR values generated by at least one of at least one wireless communication signal or the second millimeter wave signal (e.g., the signal 213a of FIG. 2B) is equal to or less than the SAR limit defined in the SAR standard. The method for adjusting the output strength of at least one of at least one wireless communication signal or the second millimeter wave signal (e.g., the signal 213a of FIG. 2B) has been described with reference to other drawings and a description thereof is omitted.

According to various embodiments, in operation 1130, the electronic device 101 may identify whether the distance (e.g., the second distance of FIG. 6) between the electronic device 101 and the object (e.g., the object 209 of FIG. 2A) has increased. If it is identified that the distance (e.g., the second distance of FIG. 6) between the electronic device 101 and the object (e.g., the object 209 of FIG. 2A) is not increased, the electronic device 101 may perform operation 1150.

According to various embodiments, if it is identified that the distance (e.g., the second distance of FIG. 6) between the electronic device 101 and the object (e.g., the object 209 of FIG. 2A) is increased, the electronic device 101 may identify whether the object (e.g., the object 209 of FIG. 2A) is positioned within the first distance (e.g., the first distance of FIG. 3) in operation 1140.

According to various embodiments, if it is identified that the object (e.g., the object 209 of FIG. 2A) is positioned within the first distance (e.g., the first distance of FIG. 3), the electronic device 101 may keep the SAR backoff function active in operation 1150. In this case, the electronic device 101 may determine (or adjust) the strength of at least one of at least one wireless communication signal or the second millimeter wave signal (e.g., the signal 213a of FIG. 2B) to be different from those determined in operation 1120. For example, as described above in connection with FIGS. 6 to 10, the electronic device 101 may determine the output strength of the second millimeter wave signal (e.g., the signal 213a of FIG. 2B) to correspond to the second distance (e.g., the second distance of FIG. 6) or may determine (or adjust) the strength of at least one wireless communication signal based on at least one of the adjusted (or changed) strength of the second millimeter wave signal (e.g., the signal 213a of FIG. 2B) or the determined priority.

According to various embodiments, if it is identified that the object (e.g., the object 209 of FIG. 2A) is not positioned within the first distance (e.g., the first distance of FIG. 3), the electronic device 101 may deactivate the SAR backoff function in operation 1160. The electronic device 101 may repeatedly and/or periodically output the first millimeter wave signal (e.g., the signal 213a of FIG. 2B), keeping the SAR backoff function inactive until the object (e.g., the object 209 of FIG. 2A) moves into the range of the first distance (e.g., the first distance of FIG. 3).

According to various embodiments, the electronic device 101 may identify that the running application (e.g., the running application of FIG. 8) ends (e.g., use of the wireless communication scheme used through the running application ends), that an electrical signal having a strength of a preset value or more is not received any longer from the grip sensor (e.g., the sensor module 176 of FIG. 1), or that the display (e.g., the display device 160 of FIG. 1) switches from the on state to the off state, deactivate the SAR backoff function, and stop outputting the first and second millimeter wave signals (e.g., the signal 213a of FIG. 2B).

Figure 12:
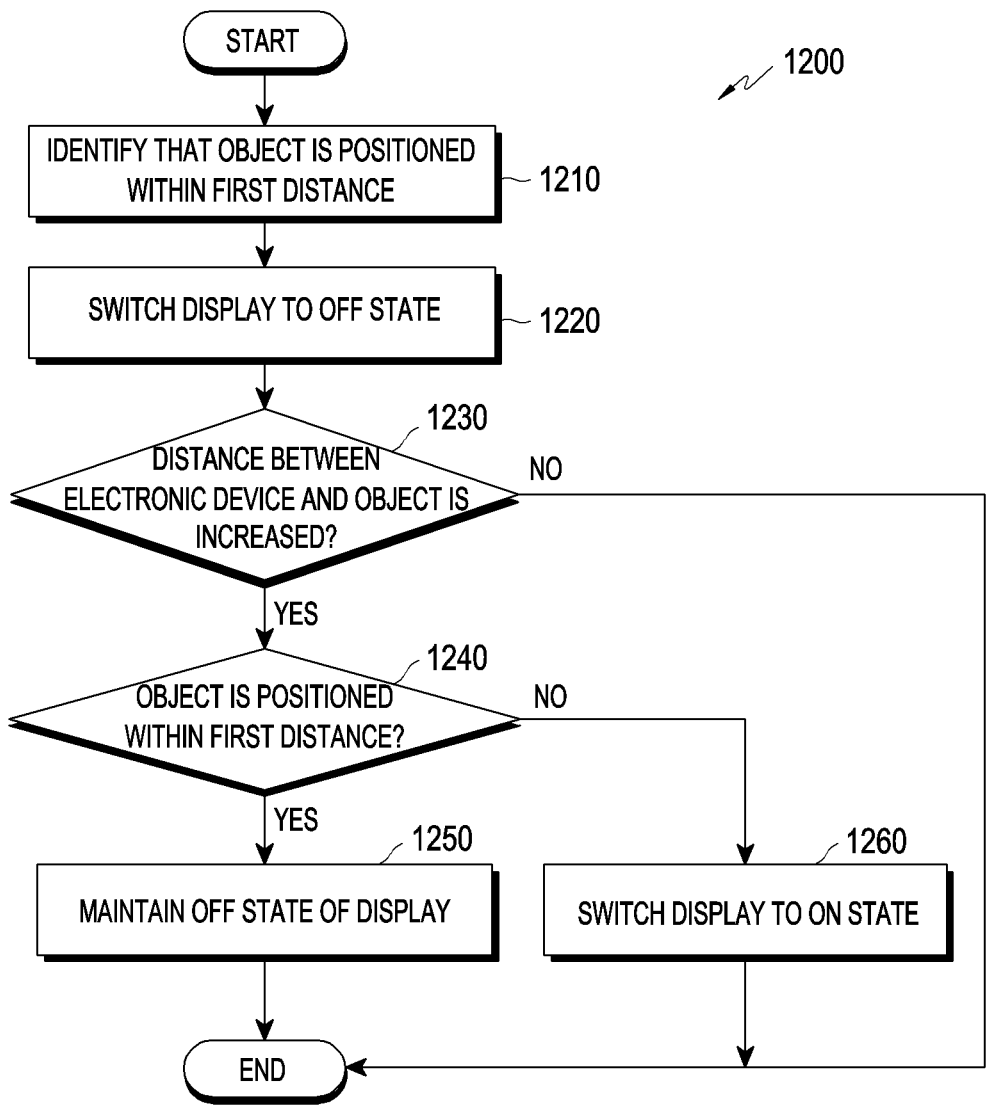
FIG. 12 is a flowchart illustrating an operation method of an electronic device according to various embodiments.

FIG. 12 is a flowchart 1200 for describing an operation method of an electronic device (e.g., the electronic device 101 of FIG. 1) according to various embodiments.

According to various embodiments, in operation 1210, the electronic device 101 may identify that the object (e.g., the object 209 of FIG. 2A) is positioned within a first distance (e.g., the first distance of FIG. 3).

According to various embodiments, the electronic device 101 may switch the display (e.g., the display device 160 of FIG. 1) to an off state (or sleep state) in operation 1220. In this case, the SAR backoff function may be in an activated state.

According to various embodiments, in operation 1230, the electronic device 101 may identify whether the distance (e.g., the second distance of FIG. 6) between the electronic device 101 and the object (e.g., the object 209 of FIG. 2A) has increased. If it is identified that the distance (e.g., the second distance of FIG. 6) between the electronic device 101 and the object (e.g., the object 209 of FIG. 2A) is not increased, the electronic device 101 may perform operation 1250.

According to various embodiments, if it is identified that the distance (e.g., the second distance of FIG. 6) between the electronic device 101 and the object (e.g., the object 209 of FIG. 2A) is increased, the electronic device 101 may identify whether the object (e.g., the object 209 of FIG. 2A) is positioned within the first distance (e.g., the first distance of FIG. 3) in operation 1240.

According to various embodiments, if it is identified that the object (e.g., the object 209 of FIG. 2A) is positioned within the first distance (e.g., the first distance of FIG. 3) (e.g., the distance between the electronic device and the object is identified as the first distance or less), the electronic device 101 may maintain the off state of the display (e.g., the display device 160 of FIG. 1) in operation 1250. In this case, the SAR backoff function may be in an activated state.

According to various embodiments, if it is identified that the object (e.g., the object 209 of FIG. 2A) is not positioned within the first distance (e.g., the first distance of FIG. 3) (e.g., if it is identified that the distance between the electronic device and the object exceeds the first distance), the electronic device 101 may switch the display (e.g., the display device 160 of FIG. 1) to the on state in operation 1260. In this case, the SAR backoff function may be in a deactivated state. The on state may mean a state in which the display (e.g., the display device 160 of FIG. 1) is activated and a screen is displayed on the display.

According to various embodiments, the electronic device 101 may identify that the running application (e.g., the running application of FIG. 8) ends (in other words, use of the wireless communication scheme used through the running application ends), that an electrical signal having a strength of a preset value or more is not received any longer from the grip sensor (e.g., the sensor module 176 of FIG. 1), or that the display (e.g., the display device 160 of FIG. 1) switches from the on state to the off state, deactivate the SAR backoff function, and stop outputting the first and second millimeter wave signals (e.g., the signal 213a of FIG. 2B).

Figure 13A:
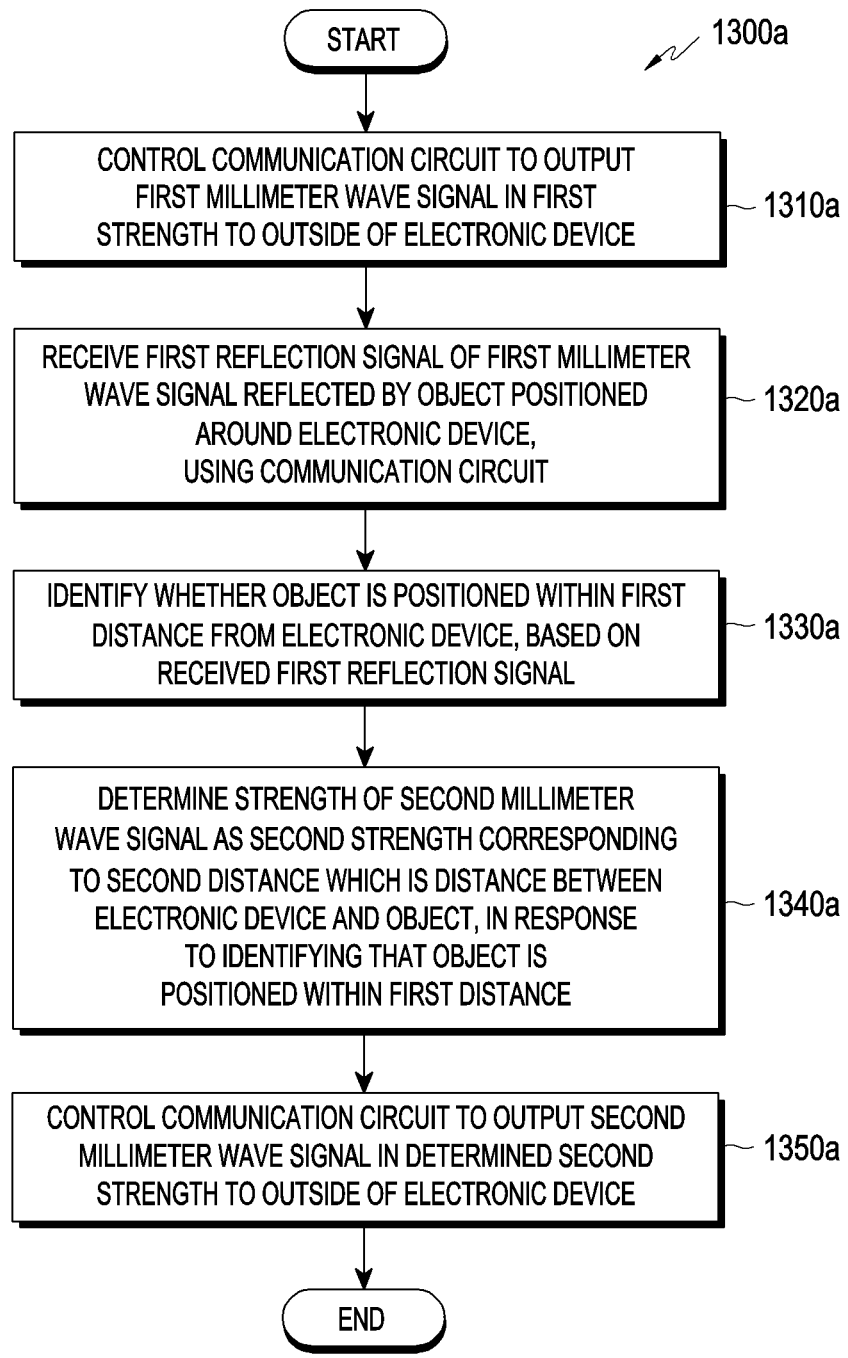
FIG. 13A is a flowchart illustrating an operation method of an electronic device according to various embodiments.

FIG. 13A is a flowchart 1300a for describing an operation method of an electronic device (e.g., the electronic device 101 of FIG. 1) according to various embodiments.

According to various embodiments, in operation 1310a, the electronic device (e.g., the processor 120 of FIG. 1) may control the communication circuit (e.g., the communication module 190 of FIG. 1) to output the first millimeter wave signal (e.g., the signal 213a of FIG. 2B) in the first strength.

According to various embodiments, in operation 1320a, the electronic device (e.g., the processor 120 of FIG. 1) may receive the first reflection signal (e.g., the reflection signal 213b of FIG. 2B) of the first millimeter wave signal reflected by an object (e.g., the object 209 of FIG. 2A) positioned around the electronic device 101, using the communication circuit (e.g., the communication module 190 of FIG. 1).

According to various embodiments, in operation 1330a, the electronic device (e.g., the processor 120 of FIG. 1) may identify whether the object (e.g., the object 209 of FIG. 2A) is positioned within a first distance (e.g., the first distance of FIG. 3) based on the received first reflection signal (e.g., the reflection signal 213b of FIG. 2B).

According to various embodiments, in operation 1340a, the electronic device (e.g., the processor 120 of FIG. 1) may determine the strength of the second millimeter wave signal (e.g., the signal 213a of FIG. 2B) as the second strength (e.g., the second strength of FIG. 3) corresponding to the second distance (e.g., the second distance of FIG. 3) which is the distance between the electronic device (e.g., the electronic device 101 of FIG. 1) and the object (e.g., the object 209 of FIG. 2A), in response to identifying that the object (e.g., the object 209 of FIG. 2A) is positioned within the first distance (e.g., the first distance of FIG. 3). The second distance (e.g., the second distance of FIG. 3) may be smaller than the first distance (e.g., the first distance of FIG. 3).

According to various embodiments, in operation 1350a, the electronic device (e.g., the processor 120 of FIG. 1) may control the communication circuit (e.g., the communication module 190 of FIG. 1) to output the second millimeter wave signal (e.g., the signal 213a of FIG. 2B) in the determined second strength (e.g., the second strength of FIG. 3) to outside of the electronic device 101.

Figure 13B:
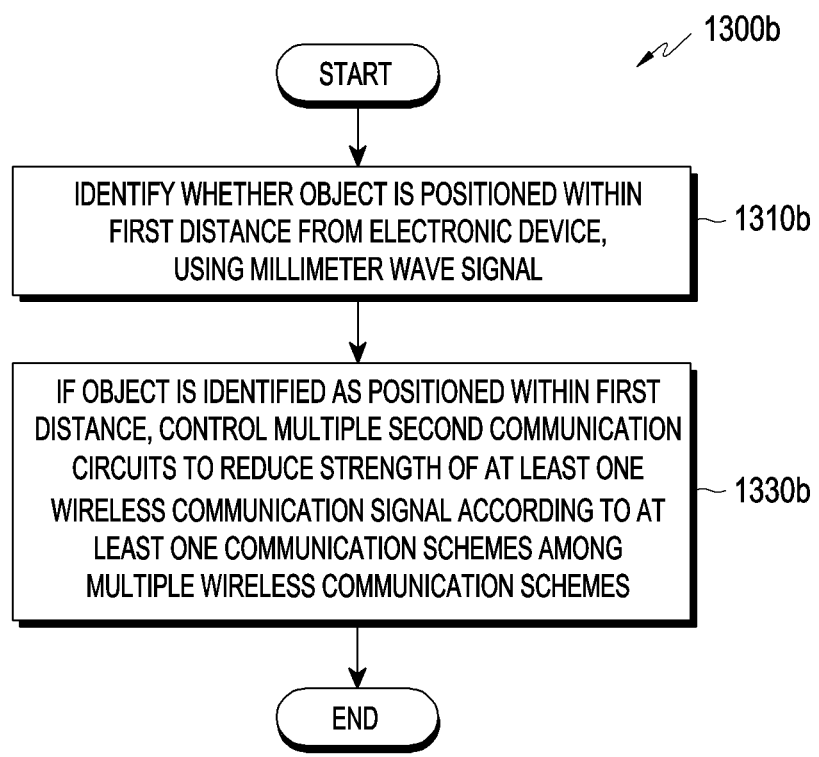
FIG. 13B is a flowchart illustrating an operation method of an electronic device according to various embodiments.

FIG. 13B is a flowchart 1300b for describing an operation method of an electronic device (e.g., the electronic device 101 of FIG. 1) according to various embodiments.

The electronic device (e.g., the processor 120 of FIG. 1) according to various embodiments may include a first communication circuit (e.g., the communication module 190 of FIG. 1) for transmitting millimeter wave signals (e.g., the signal 213a of FIG. 2B) and a second communication circuit (e.g., the communication module 190 of FIG. 1) for transmitting non-millimeter wave signals (e.g., at least one of Wi-Fi, Wi-Fi direct, Bluetooth, BLE, NFC, IrDA, radio frequency identification (RFID), or magnetic secure transmission (MST)).

According to various embodiments, in operation 1310b, the electronic device (e.g., the processor 120 of FIG. 1) may identify whether the object (e.g., the object 209 of FIG. 2A) is positioned within the first distance (e.g., the first distance of FIG. 3) from the electronic device 101 using the millimeter wave signal (e.g., the signal 213a of FIG. 2B).

According to various embodiments, in operation 1330b, if it is identified that the object (e.g., the object 209 of FIG. 2A) is positioned within the first distance (e.g., the first distance of FIG. 3), the electronic device (e.g., the processor 120 of FIG. 1) may control a plurality of second communication circuits (e.g., the communication module 190 of FIG. 1) to reduce the strength of at least one wireless communication signal (e.g., the wireless communication signal of FIGS. 7 to 11) according to a plurality of wireless communication schemes (e.g., the plurality of wireless communication schemes of FIGS. 7 to 11). At least one wireless communication scheme may be determined based on the priority or the characteristics of the application running on the electronic device 101.

According to various embodiments, an electronic device (e.g., the electronic device 101 of FIG. 1) using a millimeter wave may comprise a communication circuit (e.g., the communication module 190 of FIG. 1), and at least one processor (e.g., the processor 120 of FIG. 1) operatively connected with the communication circuit (e.g., the communication module 190 of FIG. 1). The at least one processor (e.g., the processor 120 of FIG. 1) may be configured to control the communication circuit (e.g., the communication module 190 of FIG. 1) to output a first millimeter wave signal (e.g., the signal 213a of FIG. 2B) in a first strength (e.g., the first strength of FIG. 3) to an outside of the electronic device (e.g., the electronic device 101 of FIG. 1), receive a first reflection signal (e.g., the reflection signal 213b of FIG. 2B) of the first millimeter wave signal (e.g., the signal 213a of FIG. 2B) reflected by an object (e.g., the object 209 of FIG. 2A) positioned around the electronic device (e.g., the electronic device 101 of FIG. 1), using the communication circuit (e.g., the communication module 190 of FIG. 1), identify whether the object (e.g., the object 209 of FIG. 2A) is positioned within a first distance (e.g., the first distance of FIG. 3) from the electronic device (e.g., the electronic device 101 of FIG. 1), based on the received first reflection signal (e.g., the reflection signal 213b of FIG. 2B), determine a strength of a second millimeter wave signal (e.g., the signal 213a of FIG. 2B) as a second strength (e.g., the second strength of FIG. 3) corresponding to a second distance which is a distance between the electronic device (e.g., the electronic device 101 of FIG. 1) and the object (e.g., the object 209 of FIG. 2A), in response to identifying that the object (e.g., the object 209 of FIG. 2A) is positioned within the first distance (e.g., the first distance of FIG. 3), the second distance (e.g., the second distance of FIG. 3) being smaller than the first distance (e.g., the first distance of FIG. 3), and control the communication circuit (e.g., the communication module 190 of FIG. 1) to output the second millimeter wave signal (e.g., the signal 213a of FIG. 2B) in the determined second strength (e.g., the second strength of FIG. 3) to the outside of the electronic device (e.g., the electronic device 101 of FIG. 1).

According to various embodiments, the determined second strength (e.g., the second strength of FIG. 3) may be smaller than the first strength (e.g., the first strength of FIG. 3).

According to various embodiments, the at least one processor (e.g., the processor 120 of FIG. 1) may be configured to identify an occurrence of a designated event and control the communication circuit (e.g., the communication module 190 of FIG. 1) to output the first millimeter wave signal (e.g., the signal 213a of FIG. 2B), in response to identifying the occurrence of the designated event.

According to various embodiments, the designated event may include at least one of execution of a predesignated application or obtaining of data of a threshold or more from at least one sensor (e.g., the sensor module 176 of FIG. 1).

According to various embodiments, the at least one processor (e.g., the processor 120 of FIG. 1) may be configured to determine the strength of the second millimeter wave signal (e.g., the signal 213a of FIG. 2B) as a third strength (e.g., the third strength of FIG. 6) being smaller than the second strength (e.g., the second strength of FIG. 3) when the object (e.g., the object 209 of FIG. 2A) moves to a third distance (e.g., the third distance of FIG. 6) smaller than the second distance (e.g., the second distance of FIG. 3) and control the communication circuit (e.g., the communication module 190 of FIG. 1) to output the second millimeter wave signal (e.g., the signal 213a of FIG. 2B) in the determined third strength (e.g., the third strength of FIG. 6).

According to various embodiments, the electronic device (e.g., the electronic device 101 of FIG. 1) may further comprise a plurality of wireless communication circuits (e.g., the communication module 190 of FIG. 1) configured to support a plurality of wireless communication schemes. The at least one processor (e.g., the processor 120 of FIG. 1)

may be configured to determine a strength of a plurality of communication signals so that a sum of a first SAR value generated by the second millimeter wave signal (e.g., the signal 213*a* of FIG. 2B) output in the second strength (e.g., the second strength of FIG. 3) and a second SAR value generated by the plurality of communication signals output according to the plurality of wireless communication schemes is a preset value or less.

According to various embodiments, the at least one processor (e.g., the processor 120 of FIG. 1) may be configured to identify at least one wireless communication scheme among the plurality of wireless communication schemes, related to an application running on the electronic device (e.g., the electronic device 101 of FIG. 1) and reduce a strength of a wireless communication signal output according to the identified at least one wireless communication scheme, according to a priority determined based on the running application.

According to various embodiments, the at least one processor (e.g., the processor 120 of FIG. 1) may be configured to maintain a strength of a wireless communication signal output according to a wireless communication scheme corresponding to a highest priority among the identified at least one wireless communication scheme.

According to various embodiments, the at least one processor (e.g., the processor 120 of FIG. 1) may be configured to increase a strength of at least one wireless communication signal among the plurality of wireless communication signals when the object (e.g., the object 209 of FIG. 2A) moves to a third distance (e.g., the third distance of FIG. 6) smaller than the second distance (e.g., the second distance of FIG. 3).

According to various embodiments, the electronic device (e.g., the electronic device 101 of FIG. 1) may further comprise a proximity sensor (e.g., the sensor module 176 of FIG. 1) operatively connected with the at least one processor (e.g., the processor 120 of FIG. 1). The at least one processor (e.g., the processor 120 of FIG. 1) may be configured to identify the second distance based on the first reflection signal and proximity data obtained from the proximity sensor (e.g., the sensor module 176 of FIG. 1).

According to various embodiments, a method for controlling an electronic device (e.g., the electronic device 101 of FIG. 1) using a millimeter wave (e.g., the signal 213*a* of FIG. 2B) may comprise outputting a first millimeter wave signal (e.g., the signal 213*a* of FIG. 2B) in a first strength (e.g., the first strength of FIG. 3) to an outside of the electronic device (e.g., the electronic device 101 of FIG. 1), receiving a first reflection signal (e.g., the reflection signal 213*b* of FIG. 2B), of the first millimeter wave signal (e.g., the signal 213*a* of FIG. 2B) reflected by an object (e.g., the object 209 of FIG. 2A) positioned around the electronic device (e.g., the electronic device 101 of FIG. 1), identifying whether the object (e.g., the object 209 of FIG. 2A) is positioned within a first distance (e.g., the first distance of FIG. 3) from the electronic device (e.g., the electronic device 101 of FIG. 1), based on the received first reflection signal (e.g., the reflection signal 213*b* of FIG. 2B), determining a strength of a second millimeter wave signal (e.g., the signal 213*a* of FIG. 2B) as a second strength (e.g., the second strength of FIG. 3) corresponding to a second distance (e.g., the second distance of FIG. 3) which is a distance between the electronic device (e.g., the electronic device 101 of FIG. 1) and the object (e.g., the object 209 of FIG. 2A), in response to identifying that the object (e.g., the object 209 of FIG. 2A) is positioned within the first distance (e.g., the first distance of FIG. 3), the second distance (e.g., the second distance of FIG. 3) being smaller than the first distance (e.g., the first distance of FIG. 3), and outputting the second millimeter wave signal (e.g., the signal 213*a* of FIG. 2B) in the determined second strength (e.g., the second strength of FIG. 3) to the outside of the electronic device (e.g., the electronic device 101 of FIG. 1).

According to various embodiments, the determined second strength (e.g., the second strength of FIG. 3) may be smaller than the first strength (e.g., the first strength of FIG. 3).

According to various embodiments, the method for controlling the electronic device (e.g., the electronic device 101 of FIG. 1) using the millimeter wave (e.g., the signal 213*a* of FIG. 2B) may further comprise identifying an occurrence of a designated event and outputting the first millimeter wave signal (e.g., the signal 213*a* of FIG. 2B), in response to the occurrence of the designated event.

According to various embodiments, the method for controlling the electronic device (e.g., the electronic device 101 of FIG. 1) using the millimeter wave (e.g., the signal 213*a* of FIG. 2B) may further comprise determining the strength of the second millimeter wave signal (e.g., the signal 213*a* of FIG. 2B) as a third strength (e.g., the third strength of FIG. 6) smaller than the second strength (e.g., the second strength of FIG. 3) when the object (e.g., the object 209 of FIG. 2A) moves to a third distance (e.g., the third distance of FIG. 6) smaller than the second distance (e.g., the second distance of FIG. 3) and outputting the second millimeter wave signal (e.g., the signal 213*a* of FIG. 2B) in the determined third strength (e.g., the third strength of FIG. 6).

According to various embodiments, the method for controlling the electronic device (e.g., the electronic device 101 of FIG. 1) using the millimeter wave (e.g., the signal 213*a* of FIG. 2B) may further comprise determining a strength of a plurality of communication signals so that a sum of a first SAR value generated by the second millimeter wave signal (e.g., the signal 213*a* of FIG. 2B) output in the second strength (e.g., the second strength of FIG. 3) and a second SAR value generated by the plurality of communication signals output according to the plurality of wireless communication schemes is a preset value or less.

According to various embodiments, the method for controlling the electronic device (e.g., the electronic device 101 of FIG. 1) using the millimeter wave (e.g., the signal 213*a* of FIG. 2B) may further comprise identifying at least one wireless communication scheme related to an application running on the electronic device (e.g., the electronic device 101 of FIG. 1) among the plurality of wireless communication schemes and reducing a strength of a wireless communication signal output according to the identified at least one wireless communication scheme, according to a priority determined based on the running application.

According to various embodiments, the method for controlling the electronic device (e.g., the electronic device 101 of FIG. 1) using the millimeter wave (e.g., the signal 213*a* of FIG. 2B) may further comprise maintaining a strength of a wireless communication signal output according to a wireless communication scheme corresponding to a highest priority among the identified at least one wireless communication scheme.

According to various embodiments, the method for controlling the electronic device (e.g., the electronic device 101 of FIG. 1) using the millimeter wave (e.g., the signal 213*a* of FIG. 2B) may further comprise increasing a strength of at least one wireless communication signal among the plurality of wireless communication signals when the object (e.g., the object 209 of FIG. 2A) moves to a third distance (e.g., the third distance of FIG. 6) smaller than the second distance (e.g., the second distance of FIG. 3).

According to various embodiments, an electronic device (e.g., the electronic device 101 of FIG. 1) using a millimeter wave may comprise a first communication circuit (e.g., the communication module 190 of FIG. 1) configured to output a millimeter wave signal (e.g., the signal 213a of FIG. 2B), a plurality of second communication circuits (e.g., the communication module 190 of FIG. 1) configured to support a plurality of communication schemes, and at least one processor (e.g., the processor 120 of FIG. 1) operatively connected with the first communication circuit and the second communication circuits. The at least one processor (e.g., the processor 120 of FIG. 1) may be configured to identify whether an object (e.g., the object 209 of FIG. 2A) is positioned within a first distance (e.g., the first distance of FIG. 3) from the electronic device (e.g., the electronic device 101 of FIG. 1) using the millimeter wave signal (e.g., the signal 213a of FIG. 2B) and, if the object (e.g., the object 209 of FIG. 2A) is identified to be positioned within the first distance (e.g., the first distance of FIG. 3), control the plurality of second communication circuits (e.g., the communication module 190 of FIG. 1) to reduce a strength of at least one wireless communication signal according to at least one wireless communication scheme among a plurality of communication schemes. The at least one wireless communication scheme may be determined based on at least one of priority or a characteristic of an application running on the electronic device (e.g., the electronic device 101 of FIG. 1).

According to various embodiments, the at least one processor (e.g., the processor 120 of FIG. 1) may be configured to increase a strength of at least some of at least one wireless communication signal and reduce a strength of the millimeter wave signal when the object (e.g., the object 209 of FIG. 2A) approaches the electronic device (e.g., the electronic device 101 of FIG. 1) within the first distance (e.g., the first distance of FIG. 3).

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1740) including one or more instructions that are stored in a storage medium (e.g., internal memory 1736 or external memory 1738) that is readable by a machine (e.g., the electronic device 1701). For example, a processor (e.g., the processor 1720) of the machine (e.g., the electronic device 1701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

The invention claimed is:

1. An electronic device using a millimeter wave comprising:
   a communication circuit;
   a plurality of wireless communication circuits configured to support a plurality of wireless communication schemes, and
   at least one processor operatively connected with the communication circuit, the at least one processor is configured to:
       control the communication circuit to output a first millimeter wave signal in a first strength to an outside of the electronic device,
       receive a first reflection signal of the first millimeter wave signal reflected by an object positioned around the electronic device, using the communication circuit,
       identify whether the object is positioned within a first distance from the electronic device, based on the received first reflection signal,
       determine a strength of a second millimeter wave signal as a second strength corresponding to a second distance which is a distance between the electronic device and the object, in response to identifying that the object is positioned within the first distance, the second distance being smaller than the first distance,
       control the communication circuit to output the second millimeter wave signal in the determined second strength to the outside of the electronic device,
       identify at least one wireless communication scheme related to an application running on the electronic device among the plurality of wireless communication schemes, and
       maintain a strength of a wireless communication signal output according to a wireless communication scheme corresponding to a highest priority among the identified at least one wireless communication scheme.

2. The electronic device of claim 1, wherein the determined second strength is smaller than the first strength.

3. The electronic device of claim 1, wherein the at least one processor is configured to:
   identify an occurrence of a designated event, and
   control the communication circuit to output the first millimeter wave signal, in response to identifying the occurrence of the designated event.

4. The electronic device of claim 3, wherein the designated event includes at least one of execution of a predesignated application or obtaining of data of a threshold or more from at least one sensor.

5. The electronic device of claim 1, wherein the at least one processor is configured to:
   determine the strength of the second millimeter wave signal as a third strength being smaller than the second strength when the object moves to a third distance smaller than the second distance, and
   control the communication circuit to output the second millimeter wave signal in the determined third strength.

6. The electronic device of claim 1, further comprising, wherein the at least one processor is configured to determine a strength of a plurality of communication signals so that a sum of a first SAR value generated by the second millimeter wave signal output in the second strength and a second specific absorption rate (SAR) value generated by the plurality of communication signals output according to the plurality of wireless communication schemes is a preset value or less.

7. The electronic device of claim 6, wherein the at least one processor is configured to:
   reduce a strength of a wireless communication signal output according to the identified at least one wireless communication scheme, according to a priority determined based on the running application.

8. The electronic device of claim 6, wherein the at least one processor is configured to increase a strength of at least one wireless communication signal among the plurality of wireless communication signals when the object moves to a third distance smaller than the second distance.

9. The electronic device of claim 1, further comprising a proximity sensor operatively connected with the at least one processor,
   wherein the at least one processor is configured to identify the second distance based on the first reflection signal and proximity data obtained from the proximity sensor.

10. A method for controlling an electronic device using a millimeter wave, the method comprising:
    outputting a first millimeter wave signal in a first strength to an outside of the electronic device;
    receiving a first reflection signal of the first millimeter wave signal reflected by an object positioned around the electronic device;
    identifying whether the object is positioned within a first distance from the electronic device, based on the received first reflection signal;
    determining a strength of a second millimeter wave signal as a second strength corresponding to a second distance which is a distance between the electronic device and the object, in response to identifying that the object is positioned within the first distance, the second distance being smaller than the first distance; and
    outputting the second millimeter wave signal in the determined second strength to the outside of the electronic device, identifying at least one wireless communication scheme related to an application running on the electronic device among a plurality of wireless communication schemes, and maintaining a strength of a wireless communication signal output according to a wireless communication scheme corresponding to a highest priority among the identified at least one wireless communication scheme.

11. The method of claim 10, wherein the determined second strength is smaller than the first strength.

12. The method of claim 10, further comprising:
identifying an occurrence of a designated event; and
outputting the first millimeter wave signal, in response to the occurrence of the designated event.

13. The method of claim 12, wherein the designated event includes at least one of execution of a predesignated application or obtaining of data of a threshold or more from at least one sensor.

14. The method of claim 10, further comprising:
determining the strength of the second millimeter wave signal as a third strength being smaller than the second strength when the object moves to a third distance smaller than the second distance; and
outputting the second millimeter wave signal in the determined third strength.

15. The method of claim 10, further comprising determining a strength of a plurality of communication signals output so that a sum of a first specific absorption rate (SAR) value generated by the second millimeter wave signal output in the second strength and a second SAR value generated by the plurality of communication signals output according to the plurality of wireless communication schemes is a preset value or less.

16. The method of claim 15, further comprising:
reducing a strength of a wireless communication signal output according to the identified at least one wireless communication scheme, according to a priority determined based on the running application.

17. The method of claim 15, comprising increasing a strength of at least one wireless communication signal among the plurality of wireless communication signals when the object moves to a third distance smaller than the second distance.

18. The method of claim 10, wherein the electronic device further comprises a proximity sensor operatively connected with at least one processor, and
wherein the method further comprises identifying the second distance based on the first reflection signal and proximity data obtained from the proximity sensor.

* * * * *